(12) United States Patent
Hosler et al.

(10) Patent No.: US 11,635,167 B1
(45) Date of Patent: Apr. 25, 2023

(54) QUICK-CONNECT CAMERA MOUNTS WITH MULTIPLE DEGREES OF FREEDOM

(71) Applicant: Amazon Technologies, Inc., Seattle, WA (US)

(72) Inventors: Travis Justin Hosler, Seattle, WA (US); Peter Hoeft, Seattle, WA (US); Michael Lim, Kirkland, WA (US); Joseph Horrell, Seattle, WA (US); Bruno Bianchessi Alves, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 17/470,893

(22) Filed: Sep. 9, 2021

(51) Int. Cl.
*F16M 13/02* (2006.01)
*G03B 17/56* (2021.01)
*F16M 11/04* (2006.01)
*F16M 11/42* (2006.01)

(52) U.S. Cl.
CPC ........ *F16M 13/022* (2013.01); *F16M 11/425* (2013.01); *G03B 17/561* (2013.01); *F16M 11/041* (2013.01); *F16M 2200/06* (2013.01)

(58) Field of Classification Search
CPC .. A47B 96/02–028; A47B 96/06–1483; F16M 13/022; G03B 17/561
See application file for complete search history.

(56) References Cited

U.S. PATENT DOCUMENTS

| | | | |
|---|---|---|---|
| 3,191,898 A * | 6/1965 | Mccullough | H01Q 1/084 116/28 R |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,210,368 B2 * | 7/2012 | Schwartzkopf | A47B 96/061 211/103 |
| 8,423,431 B1 | 4/2013 | Rouaix et al. | |
| 8,630,924 B2 | 1/2014 | Groenevelt et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Leon W Rhodes, Jr.
(74) *Attorney, Agent, or Firm* — Athorus, PLLC

(57) ABSTRACT

A camera mount includes a pivotable assembly of a pair of arms and a pocket into which an end of one of the arms is inserted, in one of a plurality of discrete orientations. The arms are pivotably joined to one another by a fastener and permitted to be aligned at one of a plurality of angles. The camera mount is installed in a track, a rail or another system mounted to a fixture of a materials handling facility or another environment, and a camera module is mounted to another end of one of the arms. A position of the camera module is selected by installing the camera mount into a desired location on the track, the rail or the other system. An orientation of the camera module is selected by selecting the one of the plurality of discrete orientations and aligning the arms at one of the plurality of angles.

20 Claims, 21 Drawing Sheets

(56) References Cited

U.S. PATENT DOCUMENTS

| | | |
|---|---|---|
| 8,688,598 B1 | 4/2014 | Shakes et al. |
| 8,896,671 B2 | 11/2014 | Jayaram et al. |
| 9,473,747 B2 | 10/2016 | Kobres et al. |
| 10,051,958 B2 * | 8/2018 | Andersson ............ A47B 96/068 |
| 10,530,973 B2 | 1/2020 | DePaschoal |
| 10,656,502 B1 * | 5/2020 | Sandoval ............. F16M 11/041 |
| 11,079,064 B1 * | 8/2021 | Cifers .................... F16B 2/185 |
| 2003/0002712 A1 | 1/2003 | Steenburgh et al. |
| 2004/0181467 A1 | 9/2004 | Raiyani et al. |
| 2007/0014347 A1 | 1/2007 | Prechtl et al. |
| 2007/0024743 A1 | 2/2007 | Hida |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0242837 A1 | 9/2012 | Sasagawa et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2015/0162048 A1 | 6/2015 | Hirata et al. |
| 2017/0041535 A1 | 2/2017 | Nguyen et al. |
| 2017/0178352 A1 | 6/2017 | Harmsen et al. |
| 2018/0130255 A1 | 5/2018 | Hazeghi et al. |
| 2018/0332236 A1 | 11/2018 | Glaser et al. |
| 2018/0356710 A1 | 12/2018 | Bingleman et al. |
| 2019/0028054 A1 | 1/2019 | Karkheck |
| 2019/0081587 A1 | 3/2019 | Mayfield et al. |
| 2019/0191083 A1 | 6/2019 | Gorloff |
| 2020/0201144 A1 | 6/2020 | Ramones et al. |
| 2021/0396350 A1 * | 12/2021 | Eichinger ............... A63F 13/98 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

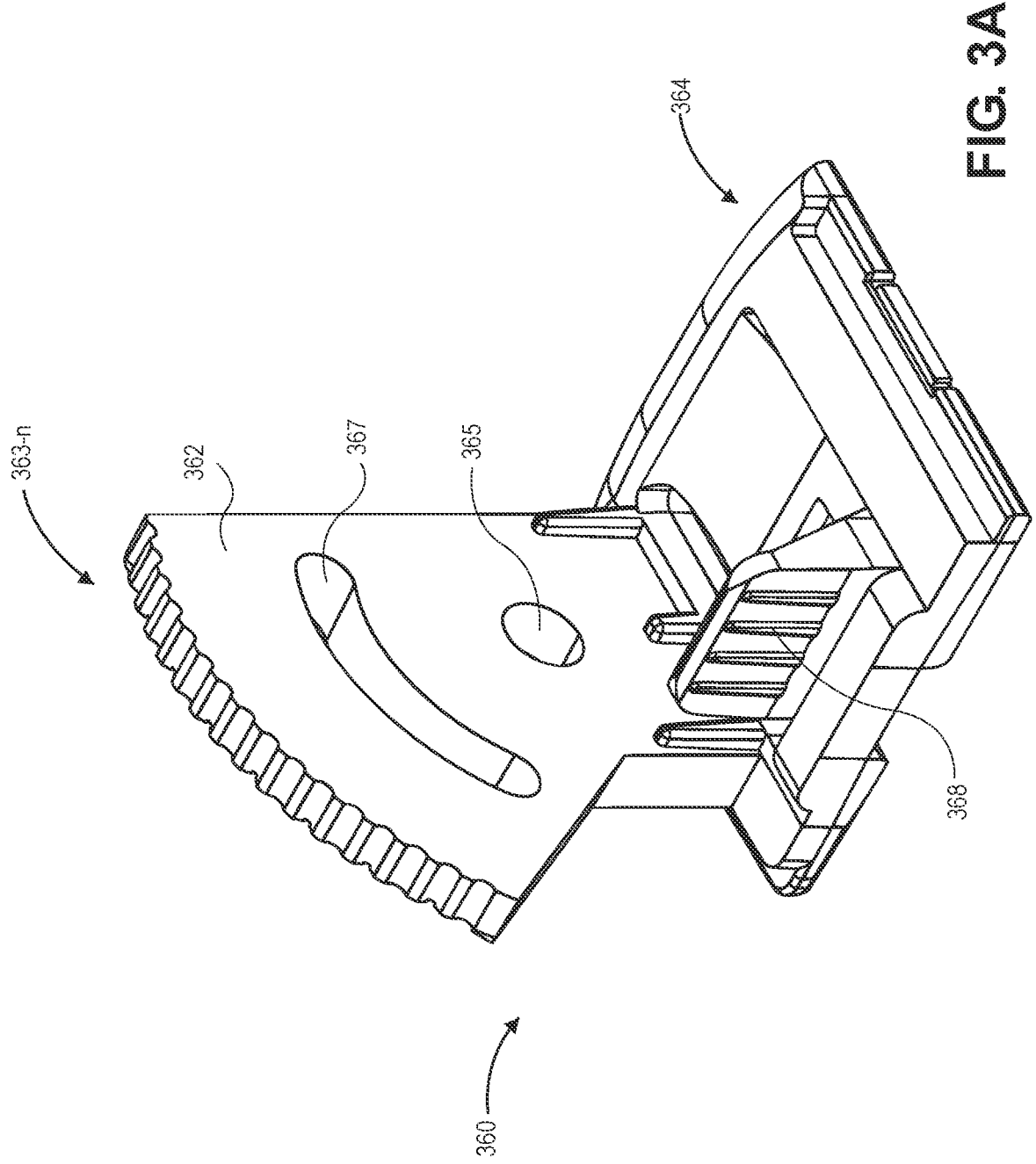

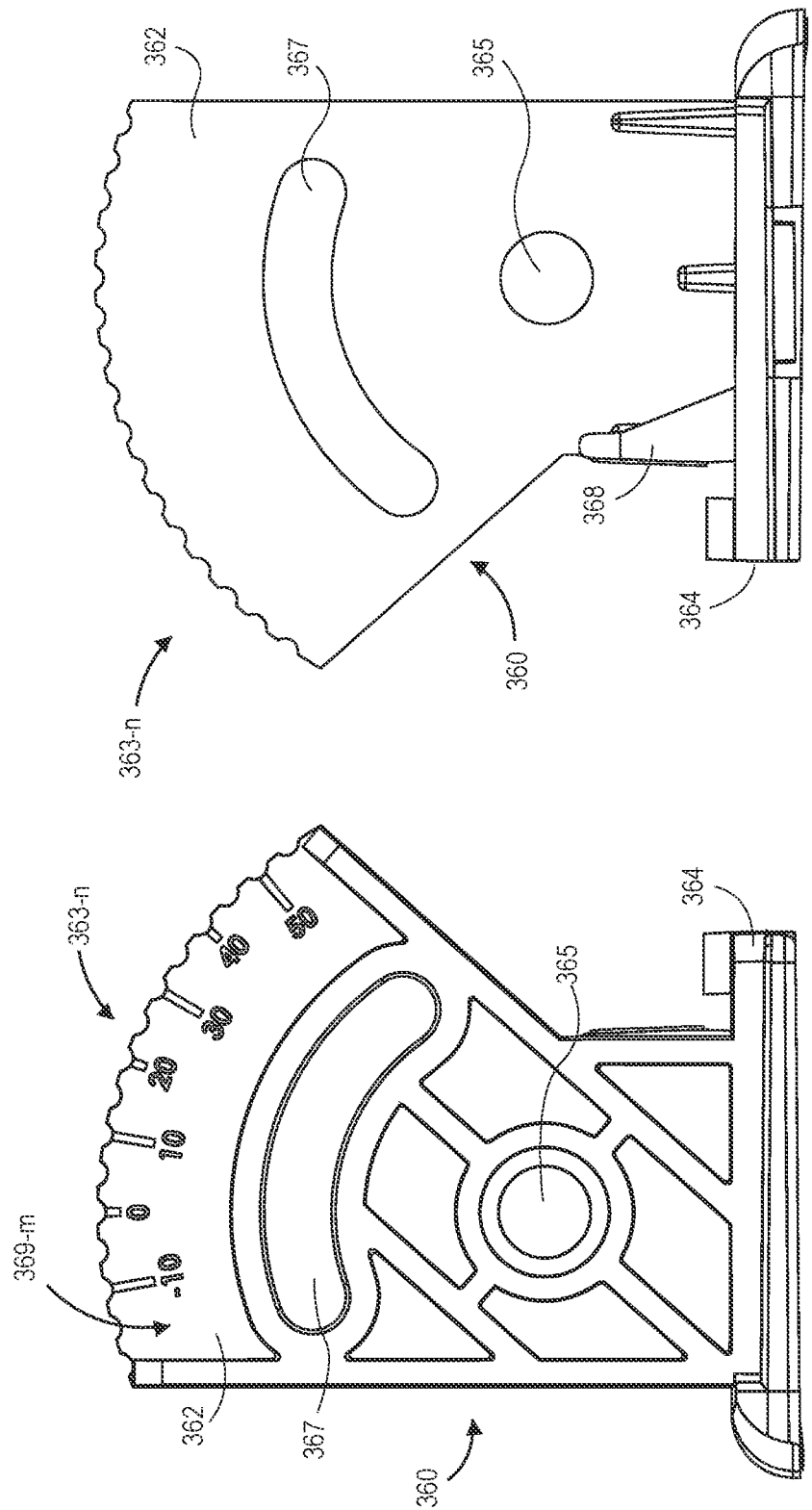

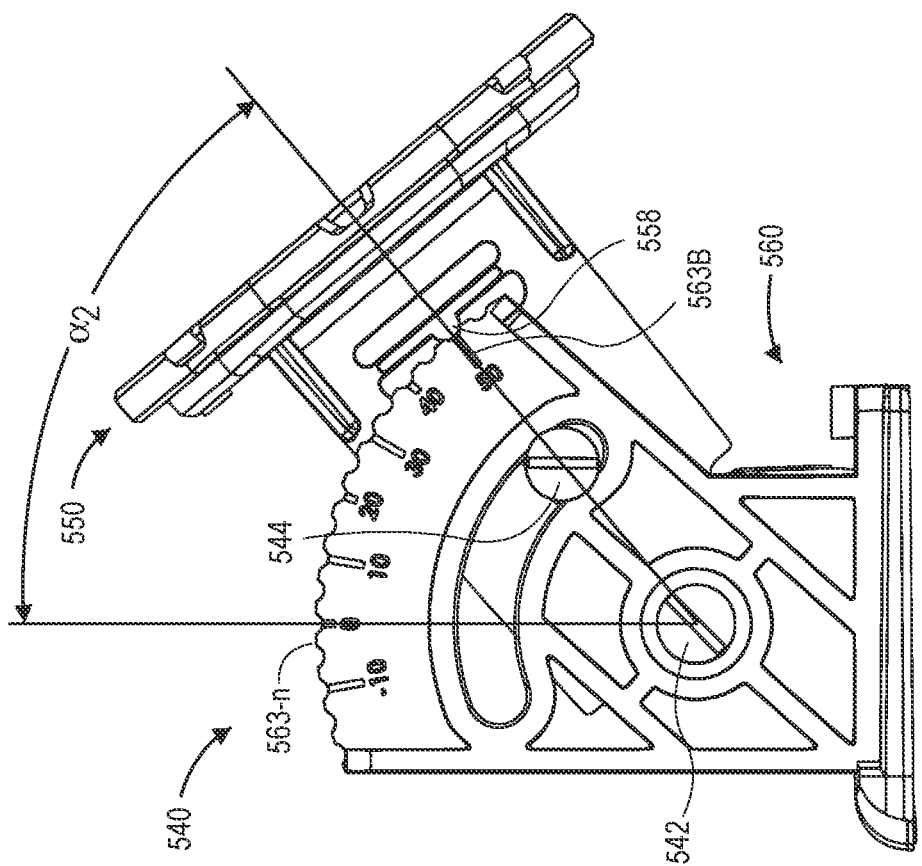
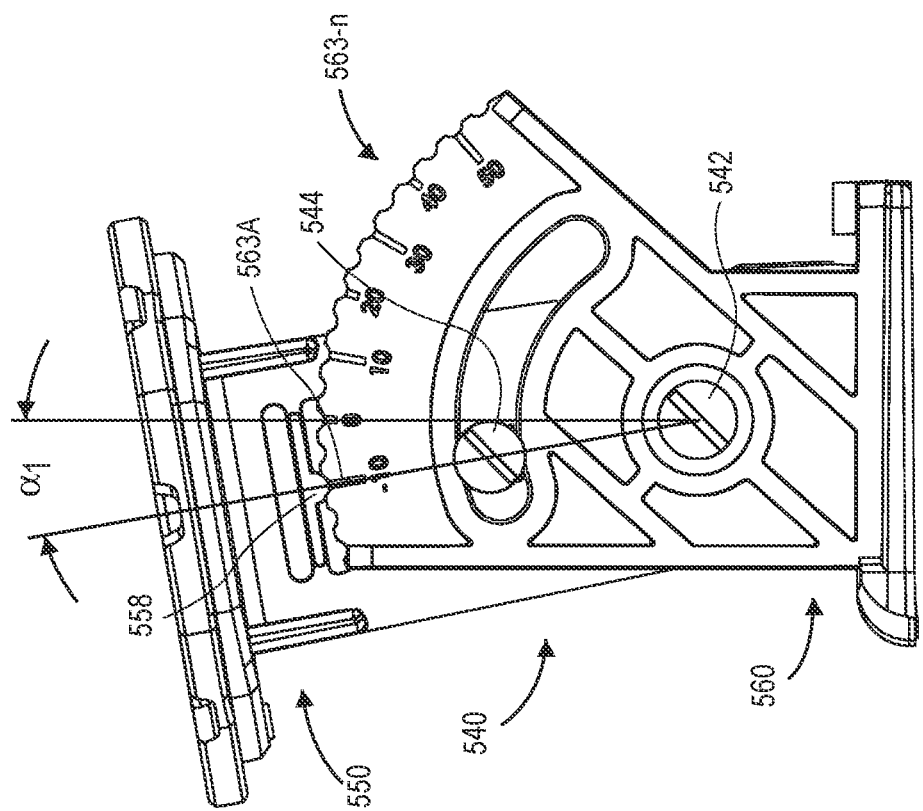
FIG. 5A
FIG. 5B

QUICK-CONNECT CAMERA MOUNTS WITH MULTIPLE DEGREES OF FREEDOM

BACKGROUND

Imaging devices, such as digital cameras, are frequently used in bricks-and-mortar commercial settings. In a materials handling facility, such as a retail store or establishment, a camera may be provided in one or more locations and configured to include portions of the materials handling facility within its field of view. Images captured by the camera may be processed to identify one or more customers or other personnel within the materials handling facility, to detect movements of such customers or personnel, or to identify items that are removed from storage units by such customers or personnel, or placed on such storage units by such customers or personnel.

Imaging devices that are provided within a materials handling facility or other relevant environments are commonly mounted in elevated configurations, e.g., on ceilings or walls, in order to ensure that the fields of view of the imaging devices include accessible floor spaces, storage units or other areas. Mounting imaging devices on ceiling or walls, however, typically requires individual mounts and power and/or network connections for each of the imaging devices. Furthermore, because fields of view of imaging devices are centered about their respective axes of orientation, and defined as functions of their respective focal lengths, locations at which the imaging devices are mounted must be selected in order to ensure that specific areas of the materials handling facility are appropriately covered.

Many devices or systems for mounting cameras are substantially rigid in nature, and unable to be easily adjusted or otherwise modified with respect to their angles or positions, however. Moreover, when a camera is mounted to a ceiling, a wall, or another fixture of a materials handling facility, an angle of orientation or a position of the camera is typically defined or limited by geographic or structural constraints of the materials handling facility. Because such constraints may not be readily modified, the angles of orientation or positions at which a camera may be mounted may be limited.

BRIEF DESCRIPTION OF THE DRAWINGS

FIGS. 3A through 3G are views of aspects of one component of a camera mount in accordance with implementations of the present disclosure.

FIGS. 5A and 5B are views of aspects of one system including a camera mount in accordance with implementations of the present disclosure.

DETAILED DESCRIPTION

As is set forth in greater detail below, the present disclosure is directed to systems for mounting cameras within environments such as materials handling facilities. More specifically, the systems and methods of the present disclosure are directed to camera mounts that enable cameras to be quickly and readily mounted or adjusted to one or more ceilings, walls or other fixtures in elevated locations within retail establishments or other materials handling facilities. In some implementations, the camera mounts may include pivotable assemblies having pairs of arms, e.g., a first arm and a second arm (or an upper arm and a lower arm), that may be configured to pivot with respect to one another. A first arm of a pivotable assembly may include a proximal end configured for releasable mounting to a pocket installed in association with a track (or a profile, a rail, or another system), at a selected alignment or orientation with respect to the pocket. A second arm of a pivotable assembly may be configured for releasably mounting a camera assembly having one or more camera modules to a distal end. The pocket may be installed in any location on the track, which may be aligned vertically, horizontally, or at any other angle.

Figure 1A:
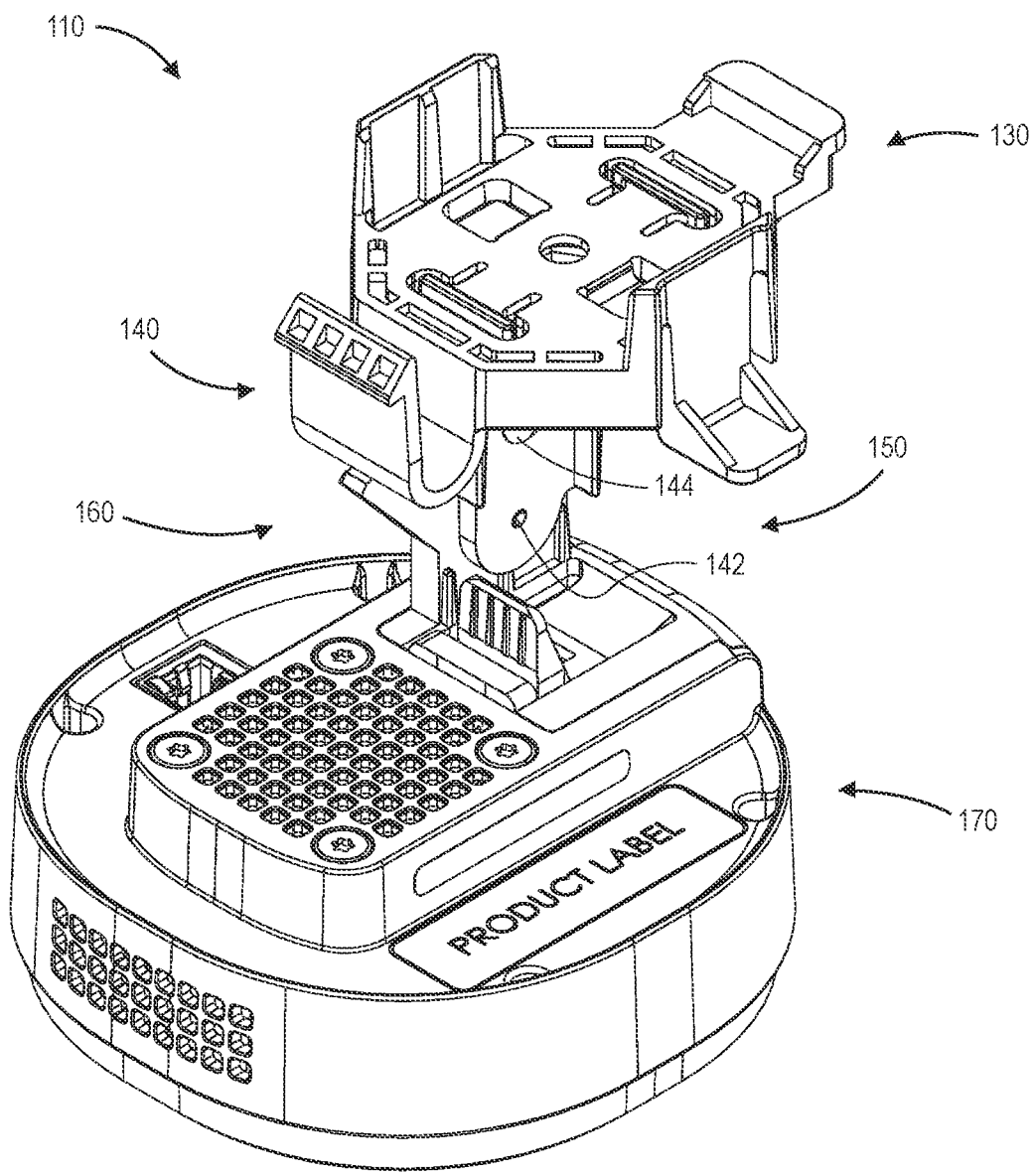
FIGS. 1A through 1D are views of aspects of one system including a camera mount in accordance with implementations of the present disclosure.

Referring to FIGS. 1A through 1D, views of aspects of one camera system 110 including a camera mount in accordance with implementations of the present disclosure are shown. As is shown in FIG. 1A, the camera system 110 includes a pocket 130, a pivotable assembly 140 having an upper arm 150 and a lower arm 160 (or a first arm and a second arm), and a camera assembly 170. The pocket 130 includes a substantially flat upper panel or face with a pair of side portions (e.g., guides) aligned substantially normal to the upper face, which has a substantially octagonal shape (e.g., a shape of a regular octagon). The pocket further includes a number of elements for mounting the camera system 110 to a track (or a profile, a rail or another system), such as a mounting extension and a mounting clip, e.g., a J-shaped clip having a flexible end with a barbed (or flared) tip or edge, which enables the pocket to be releasably mounted to the track in a snap-fit manner, or via a snap-fit connection.

One end of the upper arm 150 is releasably inserted into an opening or a cavity (not shown) of the pocket 130, on or within a lower face of the pocket 130, in a manner that defines an orientation of the pivotable assembly 140 with respect to an axis normal to the pocket 130. The end of the upper arm 150 has a substantially octagonal shape, corresponding to an interior shape of the opening or cavity of the pocket 130 into which the end of the upper arm 150 is inserted. A discrete alignment or orientation of the upper arm 150 with respect to the pocket may be selected as one of eight discrete alignments or orientations, consistent with the shapes of the end of the upper arm 150 and the cavity.

Additionally, the upper arm 150 is pivotably joined to the lower arm 160, e.g., by a screw 142 or another fastener, that enables the upper arm 150 and the lower arm 160 to pivot or rotate about an axis defined by the screw 142 or the other fastener with respect to one another, in order to define an angle of the pivotable assembly 140 accordingly. With the upper arm 150 and the lower arm 160 at a desired angle with respect to one another about the axis defined by the screw 142 or the other fastener, the upper arm 150 and the lower arm 160 may be fixed or locked in relative position with respect to one another by another fastener, e.g., a carriage bolt 144 or extending through the upper arm 150 and the lower arm 160 of FIGS. 1A through 1D, and tightened or secured by a threaded nut 146 (e.g., a wingnut).

Additionally, as is shown in FIG. 1A, one end of the lower arm 160 is releasably inserted (e.g., slidably inserted) into a corresponding slot or another portion of a housing of the camera assembly 170.

Figure 1B:
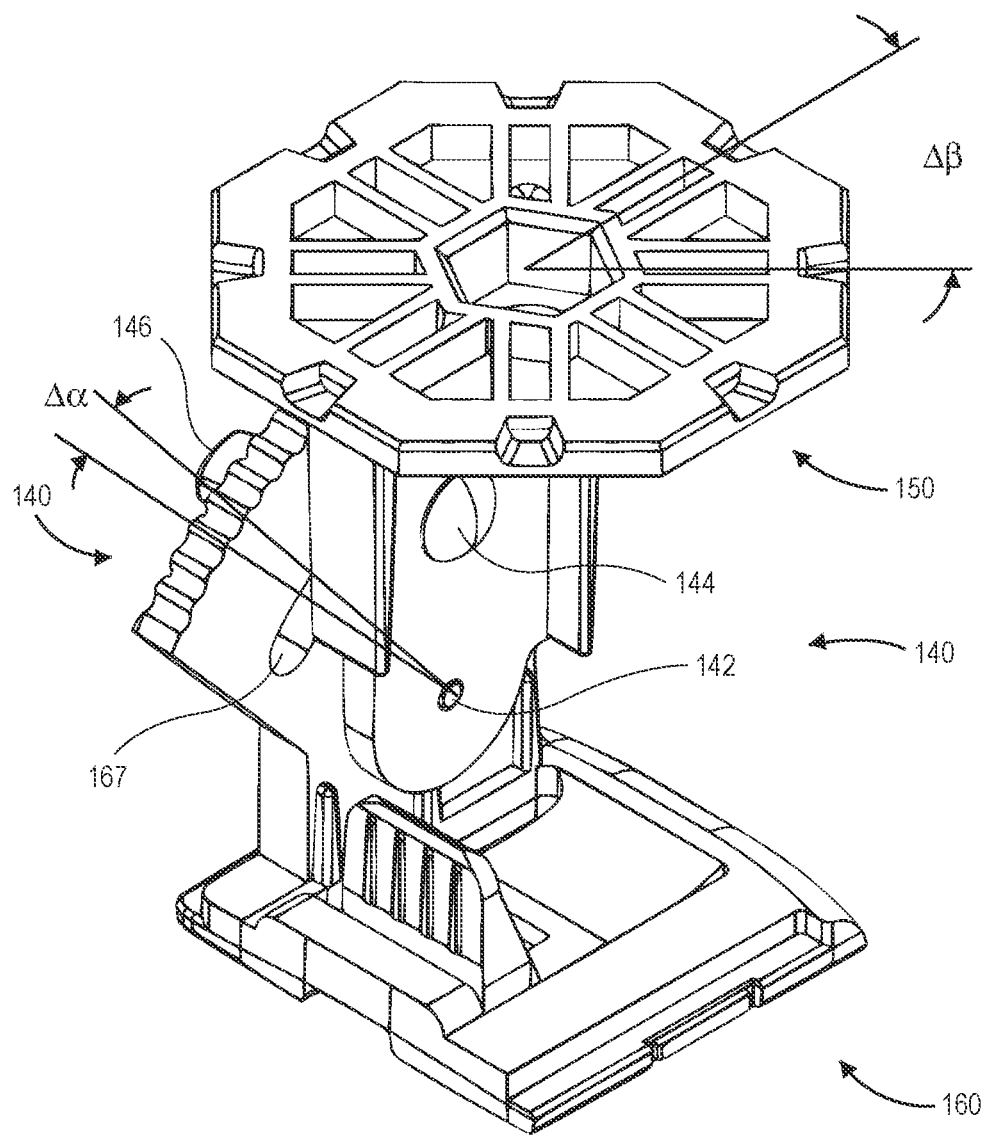

As is shown in FIG. 1B, the pivotable assembly 140 includes the upper arm 150 and the lower arm 160. The upper arm 150 and the lower arm 160 are pivotably joined and adapted to pivot or rotate with respect to one another about the screw 142, which may be a low-profile head screw or any other fastener. The upper arm 150 and the lower arm 160 may include substantially planar surfaces that are aligned to contact with one another, in a low-friction manner, as the upper arm 150 and the lower arm 160 pivot or rotate with respect to one another.

In some implementations, the screw 142 and the carriage bolt 144 are aligned parallel to one another, and the upper arm 150 and the lower arm 160 are permitted to pivot or rotate with respect to one another, about an axis defined by the screw 142.

Aspects of the pivotable assembly 140 may be rotated to define any one of a predetermined number of angles about an axis defined by the screw 142. As is shown in FIG. 1B, the lower arm 160 includes an arcuate upper edge with a plurality of notches or other indentations at angular intervals $\Delta\alpha$ defined by teeth or other extensions, and the upper arm 150 includes a detent, an arm, a pawl or another like system (not shown) aligned for insertion into one of the notches or indentations, or between any adjacent pair of the teeth or other extensions. The upper arm 150 and the lower arm 160 are thus permitted to reversibly rotate with respect to one another in either rotational direction about the screw 142, with the rotation being temporarily interrupted at the various angular intervals when the detent is aligned in one of the notches or between one of the pairs of the teeth. Where the detent is biased or mounted with a spring or another biasing element, rotating the upper arm 150 and the lower arm 160 with respect to one another from an angle defined by one of the notches to a different angle defined by another of the notches will require an additional force to enable the detent to overcome resistance supplied by teeth defining each of the notches over which the detent must travel.

Figure 1C:
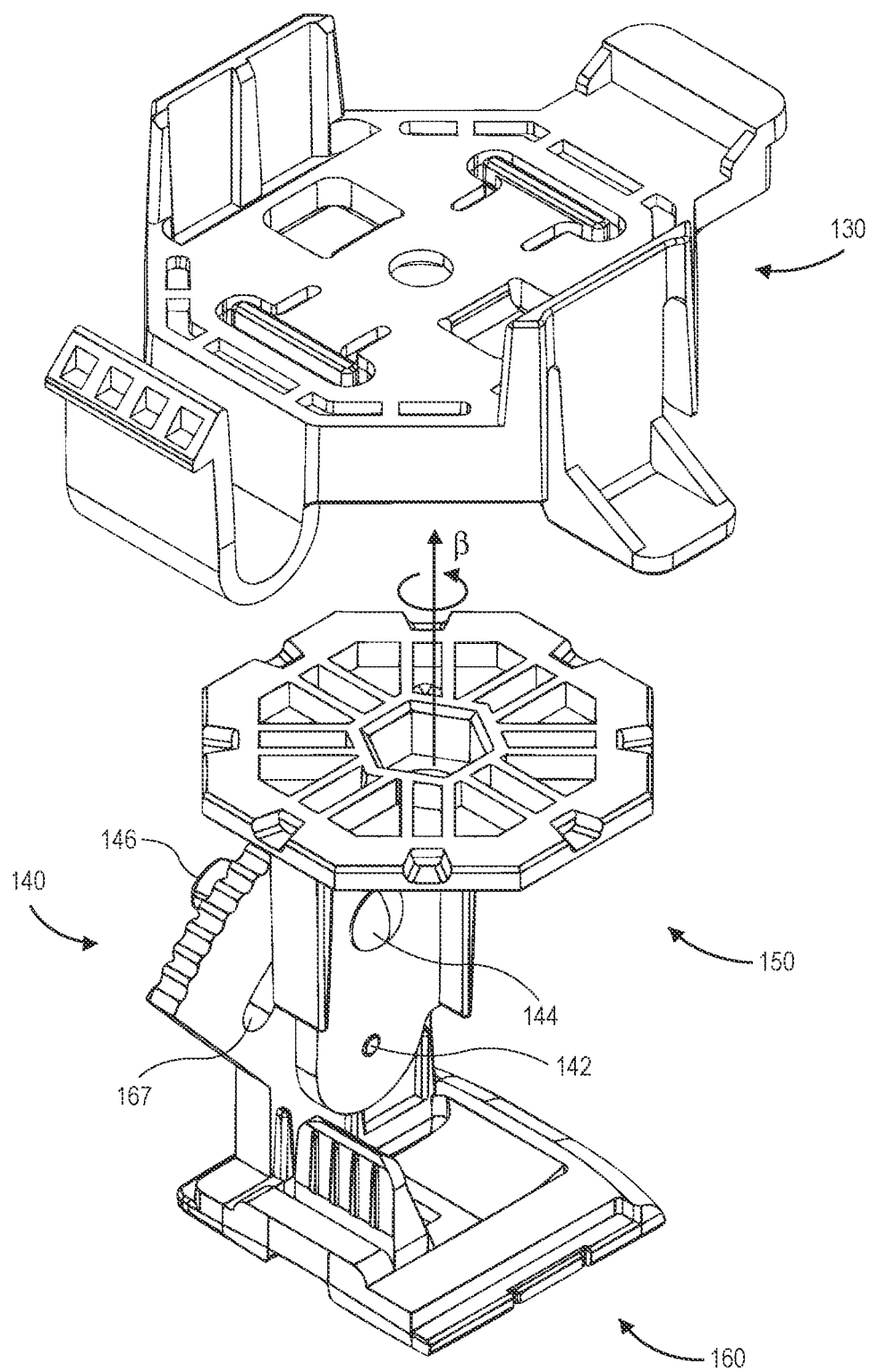

As is further shown in FIGS. 1B and 1C, the upper arm 150 includes a top panel or face having a substantially octagonal shape (e.g., a shape of a regular octagon). The top panel or face of the upper arm 150 is aligned for insertion into an opening or cavity of the pocket 130, which may have a corresponding cross-sectional area and shape for receiving the top panel or face of the upper arm 150 therein. The top panel or face of the upper arm 150 includes a plurality of ribs, strips or other elements that extend radially outward from a central region of the top panel or face of the upper arm 150 to a perimeter of the panel or face of the upper arm 150. Such ribs or other elements may thereby enhance the stiffness of the top panel or face, while reducing an overall mass of the top panel or face of the upper arm 150, as compared to a top panel or upper face having a constant thickness.

Additionally, the top panel or face of the upper arm 150 further includes eight notches or indentations on each of the edges of a perimeter of the top panel or face. Such notches or indentations may be aligned to receive one or more extensions within the opening or cavity of the pocket 130 therein. Because the top panel or face of the upper arm 150 has a shape of a regular octagon, the top panel or face of the upper arm 150 may be inserted into the opening or the cavity at any alignment or orientation $\beta$, corresponding to one of eight discrete alignments or orientations, each having an angular interval $\Delta\beta$ (or an angular separation) of approximately forty-five degrees (45°), before being inserted into the opening or cavity of the pocket 130. Alternatively, the top panel or face of the upper arm 150 may have a shape of any other polygon (preferably a regular polygon), or any other shape, and the opening or cavity of the pocket 130 may have a cross-sectional area and shape that corresponds to the top pane or face of the upper arm 150. In such implementations, a number of the alignments or orientations into which the upper arm 150 may be oriented with respect to the pocket 130 may be defined by a number of sides of a shape of the top panel or face of the upper arm 150 and the cavity of the pocket 130, where the shape is a regular polygon, or by other attributes or parameters of the shape, where the shape is other than a regular polygon (e.g., a circle, or an irregular polygon).

Figure 1D:
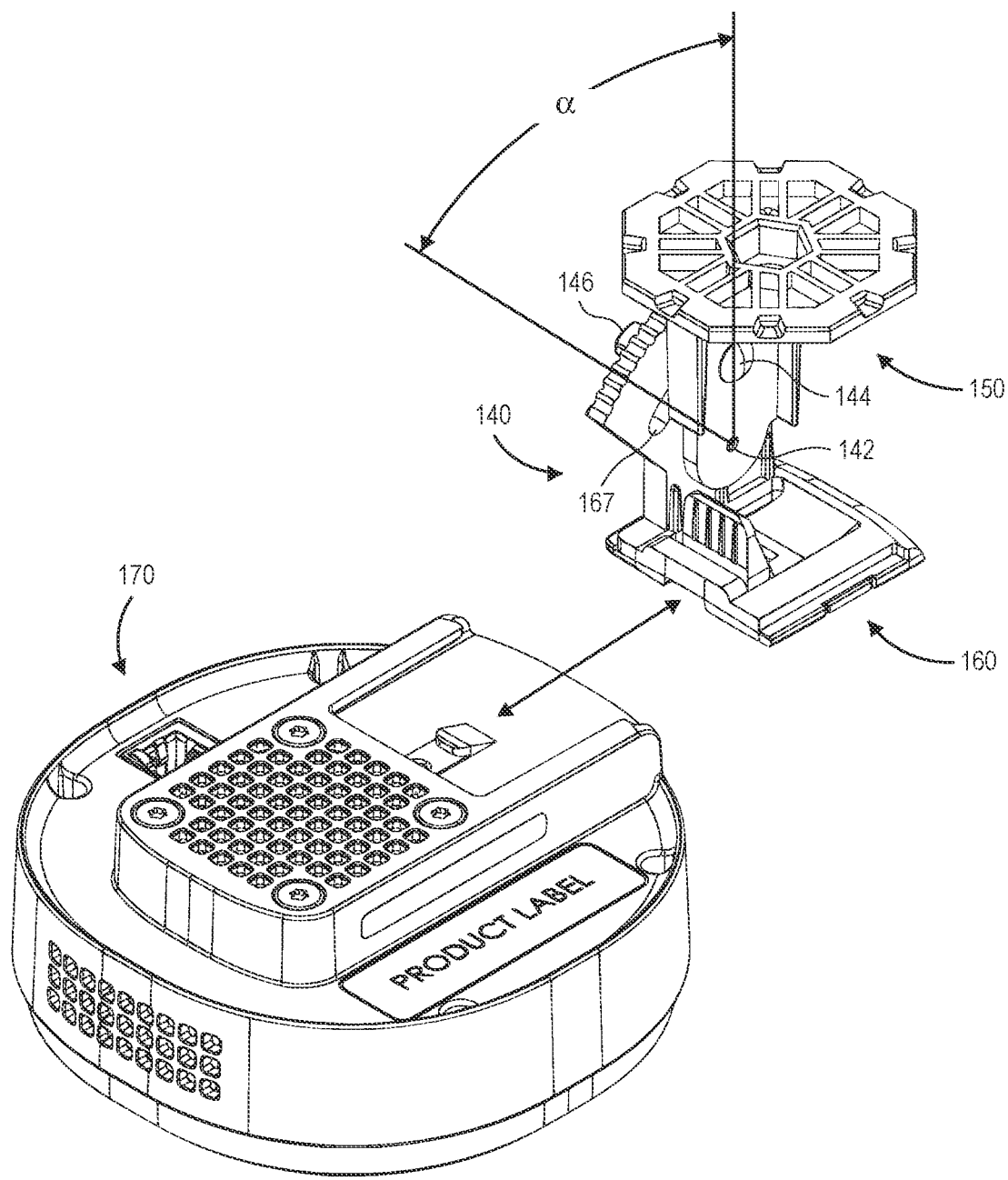

Additionally, as is shown in FIGS. 1B and 1D, a maximum range $\alpha$ of rotational or pivoting motion may be defined by an arcuate slot 167 provided in the lower arm 160. The carriage bolt 144 extends through a bore in the upper arm 150 and the arcuate slot 167 in the lower arm 160, and the relative rotation or pivoting of the upper arm 150 with respect to the lower arm 160 about an axis defined by the screw 142 may be inhibited in either rotational direction when the carriage bolt 144 contacts either of the ends of the arcuate slot 167. In some implementations, where the lower arm 160 includes a predetermined number n of notches or other indentations on an arcuate upper edge, as is shown in FIGS. 1B and 1D, and the angular intervals $\Delta\alpha$ of each of such notches or indentations is equal, an amount of the maximum range $\alpha$ of the rotational or pivoting motion may be defined as at least a product of the number n and the amount of the angular interval $\Delta\alpha$.

As is further shown in FIGS. 1B and 1D, the lower arm 160 includes an end having a slot interface (e.g., a base, a foot or a sled) that is aligned for slidable insertion into a corresponding slot or opening in the camera assembly 170. The slot interface may have a substantially cross-sectional area or shape that corresponds to an area and at least a portion of the shape of the corresponding slot or opening of the camera assembly 170.

For example, as is shown in FIGS. 1B and 1D, the slot interface at the end of the lower arm 160 has a substantially square shape, and the slot or opening in the camera assembly 170 has a perimeter partially defined by at least three sides corresponding to the substantially square shape, with an open fourth side, and the slot interface may be slidably inserted into the slot or opening by way of the fourth side. The substantially square shape of the slot interface, and the corresponding shape of the slot or opening of the camera assembly 170, provide enhanced resistance against relative rotation of the lower arm 160 with respect to the camera assembly 170, when the slot interface of the lower arm 160 is inserted into the slot or other opening of the camera assembly 170. Alternatively, the slot interface provided at the end of the lower arm 160 may have a shape of any other polygon (e.g., a regular polygon other than a square), or any other shape (e.g., a circle), and the slot or opening of the camera assembly 170 may have a cross-sectional area and shape that corresponds at least in part to the shape of the slot interface of the lower arm 160.

Moreover, the pivotable assembly 140 may engage with the camera assembly 170, such as is shown in FIG. 1D, where the lower arm 160 and/or the camera assembly 170 include one or more spring-bound or snap-fit features that retain the slot interface of the lower arm 160 within the slot or opening of the camera assembly 170. For example, in some implementations, one of the slot interface of the lower arm 160 or the slot or opening of the camera assembly 170 may include a latch or another feature that may engage with a corresponding slot or opening of the other of the lower arm 160 or the camera assembly 170. In such implementations, the latch or other feature may include a release that may be manually activated, e.g., by a thumb or another finger of a hand, to disengage the lower arm 160 and the camera assembly 170 from one another.

The camera assembly 170 may include any number of components provided within a housing, which may be formed from one or more parts. For example, the camera assembly 170 may include any number of sensors (e.g., color sensors, grayscale sensors, black-and-white sensors, depth sensors), as well as any number of processors, transceivers or other components such as lenses, memory or storage components, illuminators, photosensitive surfaces, filters, chips, electrodes, clocks, boards, timers, power sources, connectors or any other relevant features, which may be provided on one or more circuit boards or other assemblies. Additionally, the camera assembly 170 may further include one or more ports or other interfaces for receiving power, information or data, e.g., Ethernet connections, as well as any number of labels for visually conveying information regarding the camera assembly 170. For example, the camera assembly 170 may include labels or other information printed thereon identifying the camera assembly 170, a location of a facility or an environment in which the camera system 110 or the camera assembly 170 are mounted, any capacities or features of the camera assembly 170, or any operating instructions or other relevant information regarding the camera assembly 170.

Thus, the camera mounts of the present disclosure may enable camera assemblies (e.g., of one or more camera modules) to be mounted to any surface within a materials handling facility or other environment, and aligned in any desired manner or orientation. For example, as is shown in FIGS. 1A through 1D, a pair of arms may be joined to form a pivotable assembly. A proximal end of the pivotable assembly, e.g., the octagonal shaped upper panel shown in FIGS. 1B and 1C, may be inserted into a cavity or another opening of a pocket or another system, e.g., in a desired one of a plurality of discrete orientations defined by the proximal end of the pivotable assembly and the cavity or the other opening of the pocket. Likewise, a desired angle of the pivotable assembly may be established by placing the arms from which the pivotable assembly is formed into a desired angle. By mounting a camera assembly to a distal end of the pivotable assembly, attributes of the camera assembly such as a yaw angle and/or a pitch angle of a camera module, or a position of the camera module, may be selected based on the angles or orientations of arms of the pivotable assembly with respect to one another and an alignment of a track (or a profile, a rail or another system) to which the pivotable assembly is mounted.

Components of the shown in FIGS. 1A through 1D may be formed in any manner, such as by injection molding, and from any suitable materials. For example, in some implementations, one or more of the pocket 130, the upper arm 150, the lower arm 160 or a housing of the camera assembly 170 may be formed from plastics such as polycarbonates, acrylonitrile butadiene styrenes (or "ABS"), fiber-reinforced plastics (e.g., fiberglass), or other materials, or combinations thereof. In some other applications, a track, a profile, a rail or another system to which the camera system 110 may be mounted, e.g., by way of the pocket 130, may be formed from aluminum (e.g., extruded aluminum), steels (e.g., cold-rolled steels), bent sheet metal, or any other metals of any suitable thicknesses. Alternatively, in some other implementations, one or more of the pocket 130, the upper arm 150, the lower arm 160 or a housing of the camera assembly 170 may be formed from any materials other than plastics, composites or metals, including but not limited to woods.

Referring to FIGS. 2A through 2G, views of aspects of one component of a camera mount in accordance with implementations of the present disclosure. Except where otherwise noted, reference numerals preceded by the number "2" shown in FIGS. 2A through 2G indicate components or features that are similar to components or features having reference numerals preceded by the number "1" shown in FIGS. 1A through 1D.

Figure 2A:
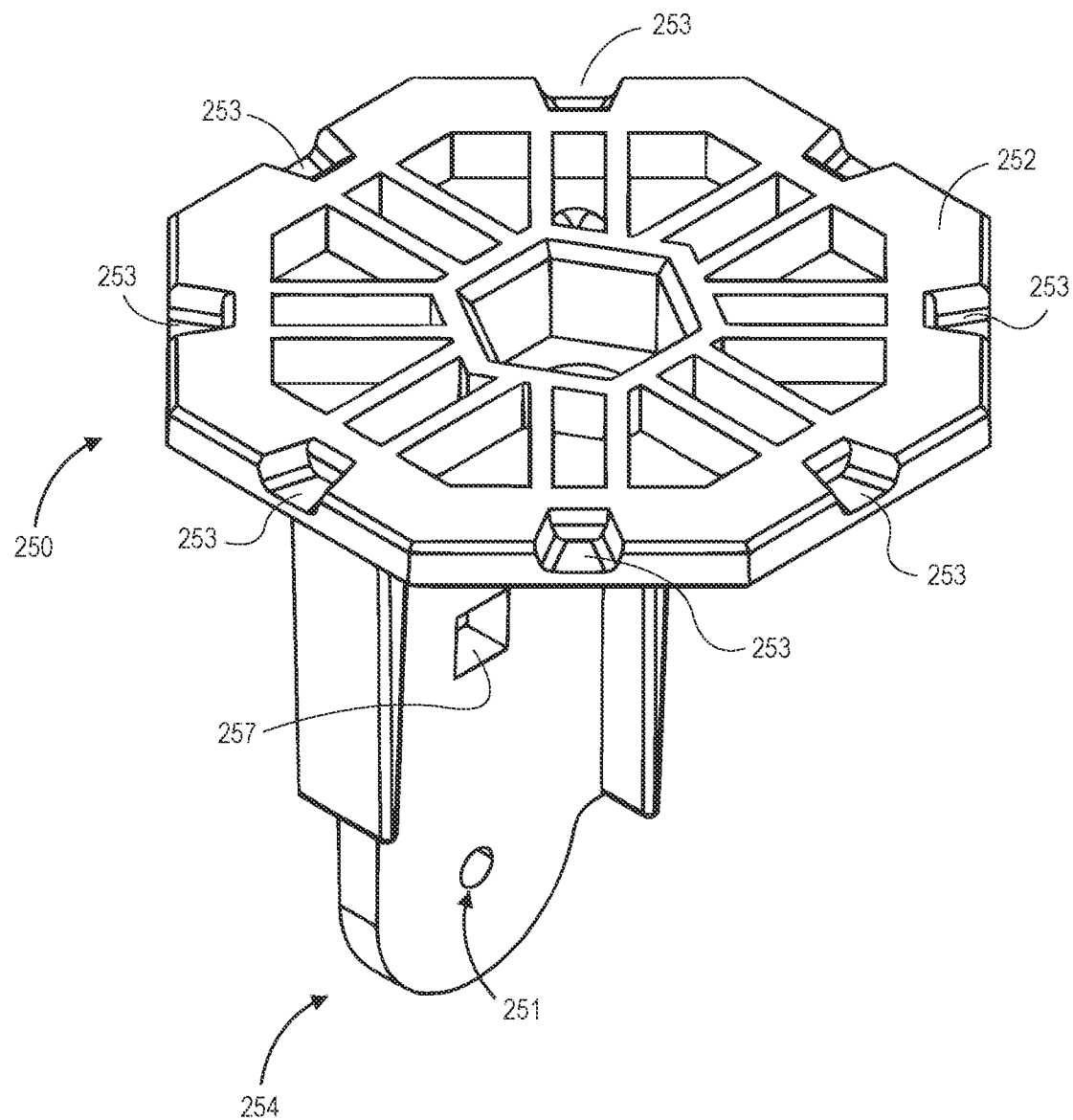
FIGS. 2A through 2G are views of aspects of component of a camera mount in accordance with implementations of the present disclosure.
Figure 2C:
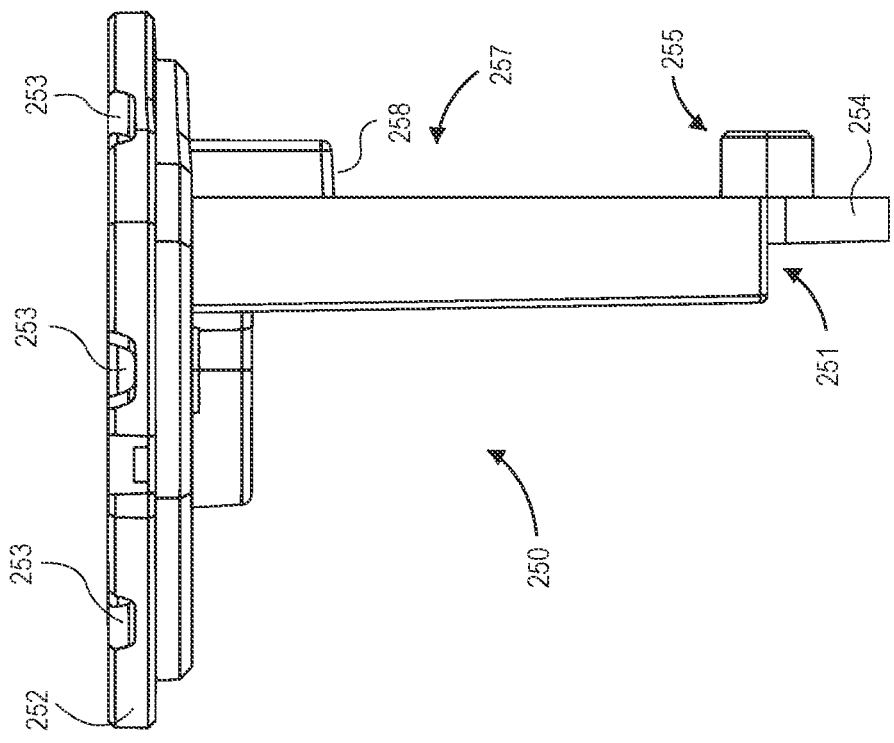
Figure 2B:
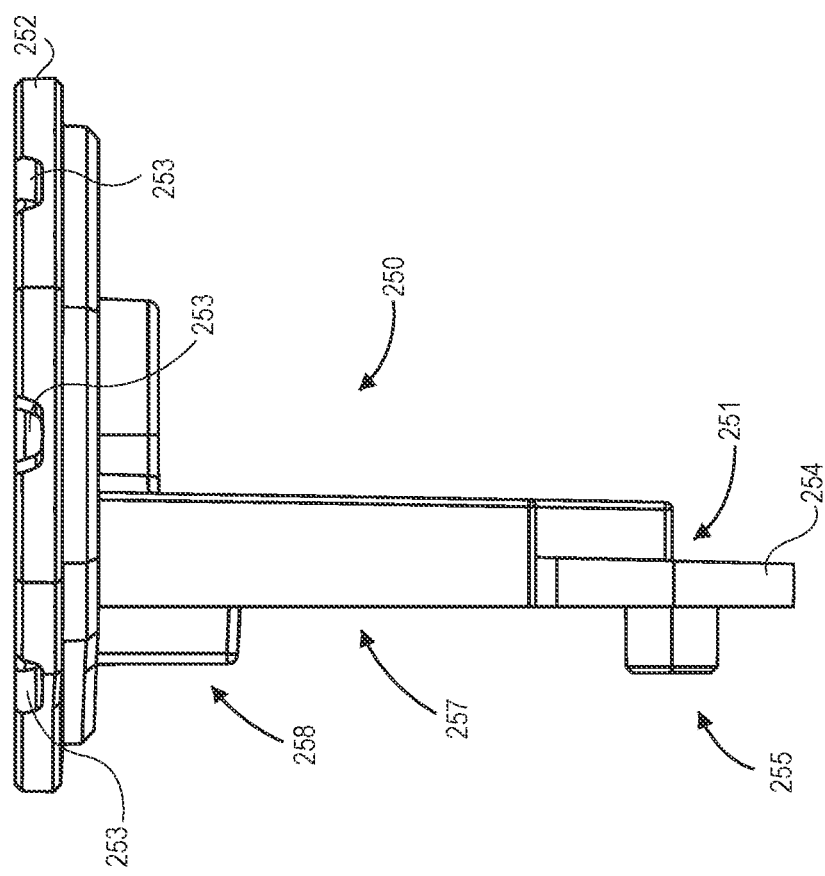
Figure 2E:
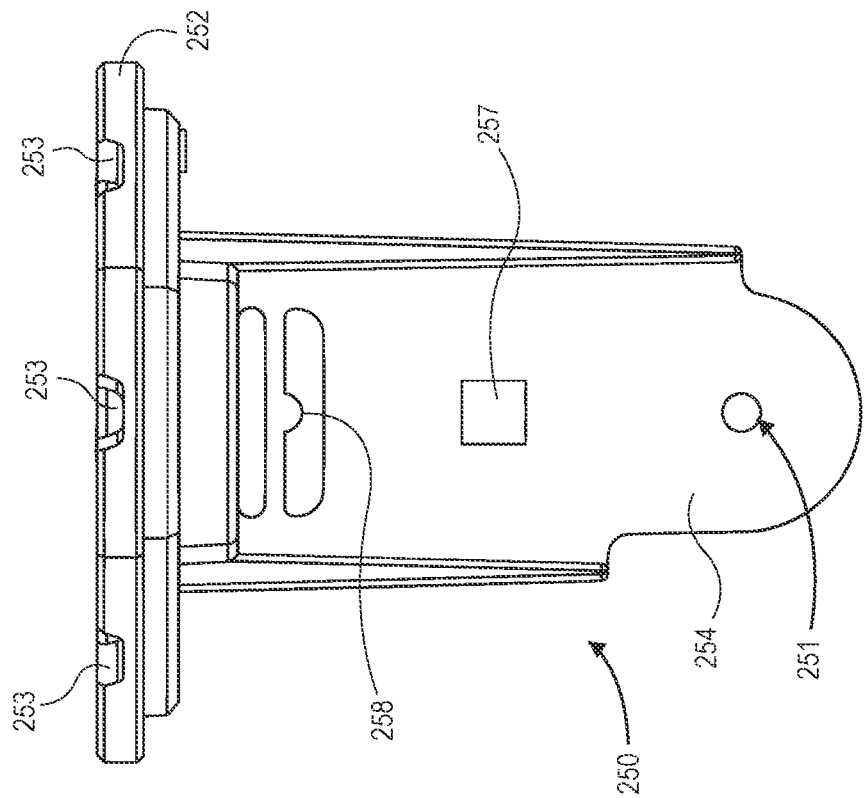
Figure 2D:
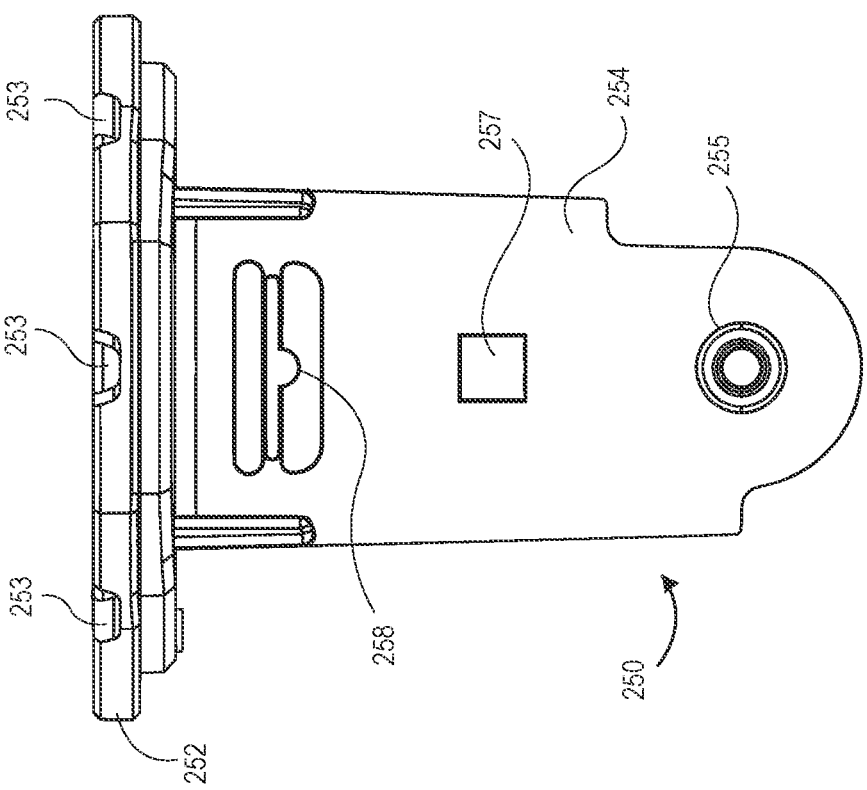
Figure 2G:
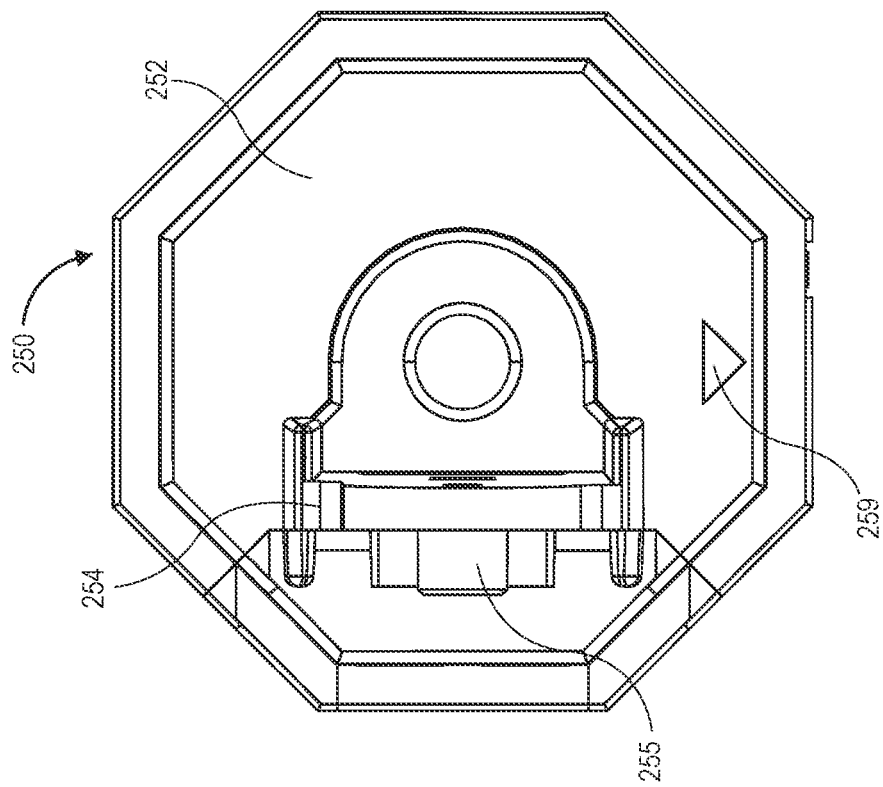
Figure 2F:
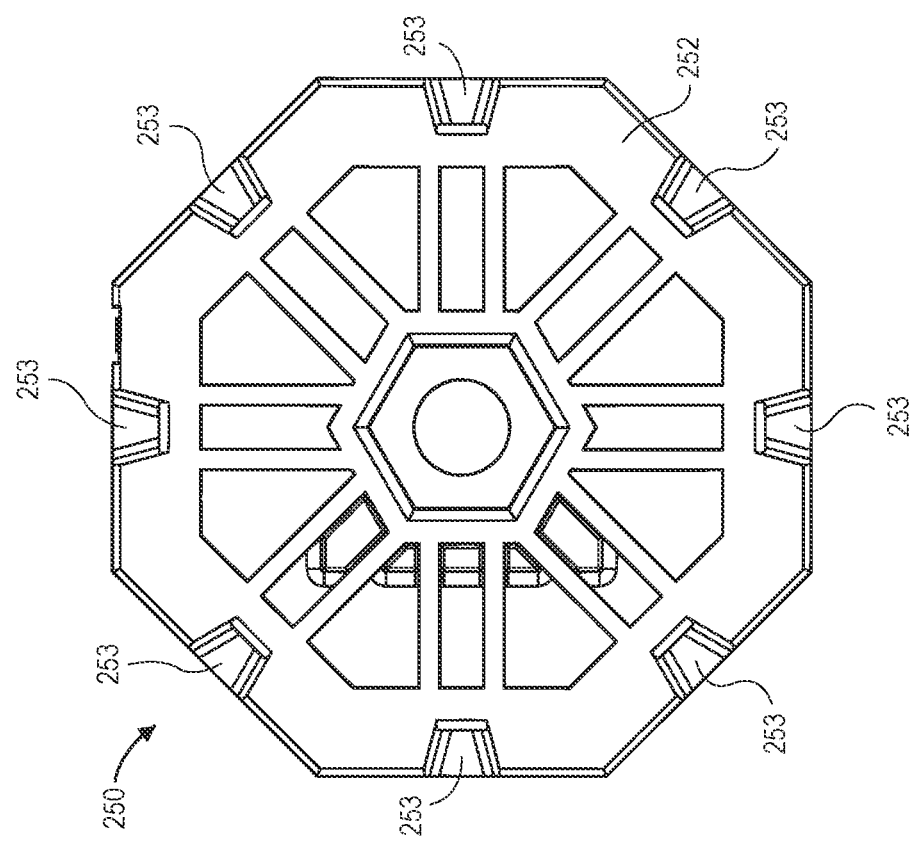

As is shown in FIGS. 2A through 2G, an arm 250 of a camera mount includes a substantially flat panel (or face) 252 mounted in a substantially normal orientation with respect to an extension 254. FIG. 2A is a perspective view of the arm 250, which includes one or more features or elements that are similar to features or elements of the upper arm 150 of FIGS. 1A through 1D, but may be provided in any location or orientation with respect to another arm, or any other aspects of a camera mount or a camera system in accordance with implementations of the present disclosure. FIGS. 2B and 2C are front and rear views, respectively, of the arm 250. FIGS. 2D and 2E are left and right views, respectively, of the arm 250. FIGS. 2F and 2G are top and bottom views, respectively, of the arm 250.

As is also shown in FIGS. 2A through 2G, the panel 252 has a shape and a cross-section of an octagon (e.g., a regular octagon), and includes a plurality of notches 253. The panel 252 may be solid or partially hollow or defined by a lattice-like structure of ribs, strips or other elements that extend across a cross-section of the panel 252 and intersect therein, e.g., in substantially radial orientations or configurations between edges of the panel 252 and one or more internal sections or areas of the panel 252. Alternatively, in some implementations, the panel 252 may be solid, or free of any openings. Additionally, as is shown in FIGS. 2A and 2F, each of the notches 253 is provided on one of the edges of the panel 252, at or near a midpoint of each of such edges.

Additionally, the extension 254 includes a substantially flat web aligned substantially normal to an underside of the panel 252, along with a pair of substantially flat flanges that are provided on longitudinal edges of the web, and extend substantially perpendicular to the web in a direction corresponding to one side of the web. The flanges may stiffen or provide rigidity to the extension 254, and enhance the capacity of the extension 254 to resist torsion or bending during operation.

The arm 250 may be joined to another arm e.g., the lower arm 160 of FIGS. 1A through 1D, or the arm 360 of FIGS. 3A through 3G, by one or more fasteners to form an assembly in a manner that enables the arm 250 and the other arm to pivot or rotate with respect to one another, and to establish a desired angle between the arm 250 and the other arm. For example, as is shown in FIGS. 2A through 2E, the extension 254 further includes a raised boss 255 provided on one side of the extension 254 that includes an opening 251 for receiving a screw or another fastener therein. The boss 255 may be extended through a bore or another opening in another arm to be joined to the arm 250, e.g., the lower arm 160 of FIGS. 1A through 1D, or the arm 360 of FIGS. 3A through 3G. Where the boss 255 and the other arm are formed from a common, low-friction material, such as plastics, polycarbonates, ABS, fiberglass or others, inserting the boss 255 through a bore or another opening enables the arm 250 and the other arm to rotate with respect to one another with limited friction and enhanced durability.

Moreover, a screw or another fastener inserted into the opening 251 of the boss 255 may be used to pivotably or rotatably couple the arm 250 to another arm to form a pivotable assembly (or rotatable assembly), about which the arm 250 and the other arm may rotate with respect to one another. The boss 255, or the opening 251 and a screw or another fastener inserted therein, may define an axis about which the arm 250 may pivot or rotate with respect to the other arm in order to establish an angle of the pivotable assembly. Additionally, the extension 254 also includes an opening 257 for receiving a fastener therein. For example, as is shown in FIGS. 2A through 2E, the opening 257 has a substantially square cross-sectional area for receiving a fastener, such as a carriage bolt, having a cross-section of a corresponding area and shape therein. Such a fastener may extend through both the opening 257 and a corresponding arcuate slot in another arm, e.g., the arcuate slot 167 of FIGS. 1B through 1D, to define a maximum range or extent to which the arm 250 and the other arm may be permitted to pivot or rotate with respect to one another about the axis defined by the boss 255.

In some implementations, the side of the web of the extension 254 that includes the boss 255 and is opposite the pair of flanges of the extension 254 may include a planar surface that is provided adjacent to and in contact with a corresponding surface of another arm, e.g., the lower arm 160 of FIGS. 1A through 1D, or the arm 360 of FIGS. 3A through 3G, in a manner that permits the arm 250 and the other arm to pivot or rotate with respect to one another.

The extension 254 further includes a detent (or an arm, a pawl or another like system) 258 provided on one side (e.g., a left side) of the extension 254. The detent 258 is provided on the same side of the extension 254 that is opposite the pair of flanges of the extension 254. The detent 258 is aligned to be in contact with an edge or a surface of another arm provided on that side, e.g., in a notch or an indentation on the edge or the surface of the other arm, and to interrupt the rotation of that arm with respect to the arm 250 in a discrete orientation or alignment. In some implementations, rotating the arm 250 and another arm with respect to one another would require an additional force to enable the detent 250 to travel from one notch on the other arm to another notch on the other arm. Additionally, in some implementations, the detent 258 may be biased by one or more springs or other biasing elements.

As is further shown in FIG. 2G, an underside of the panel 252 may include a marking 259 or another visual identifier (e.g., a pointer or triangle) aligned with respect to a midpoint on one of the sides or edges of the panel 252. Where the panel 252 of the arm 250 is inserted into a pocket or another system having a shape and an area corresponding to that of a panel 252, and in a discrete alignment or orientation, the marking 259 or the other visual identifier may be used to visually determine the discrete alignment or orientation with respect to any corresponding markings or visual identifiers on adjacent surfaces of the pocket or the other system.

Referring to FIGS. 3A through 3G, views of aspects of one component of a camera mount in accordance with implementations of the present disclosure. Except where otherwise noted, reference numerals preceded by the number "3" shown in FIGS. 3A through 3G indicate components or features that are similar to components or features having reference numerals preceded by the number "2" shown in FIGS. 2A through 2G or by the number "1" shown in FIGS. 1A through 1D.

Figure 3C:
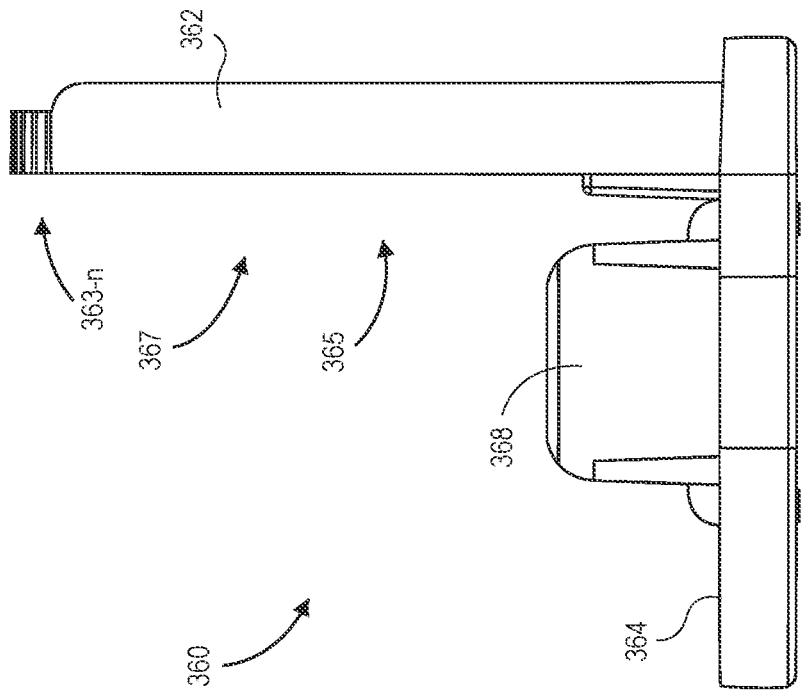
Figure 3B:
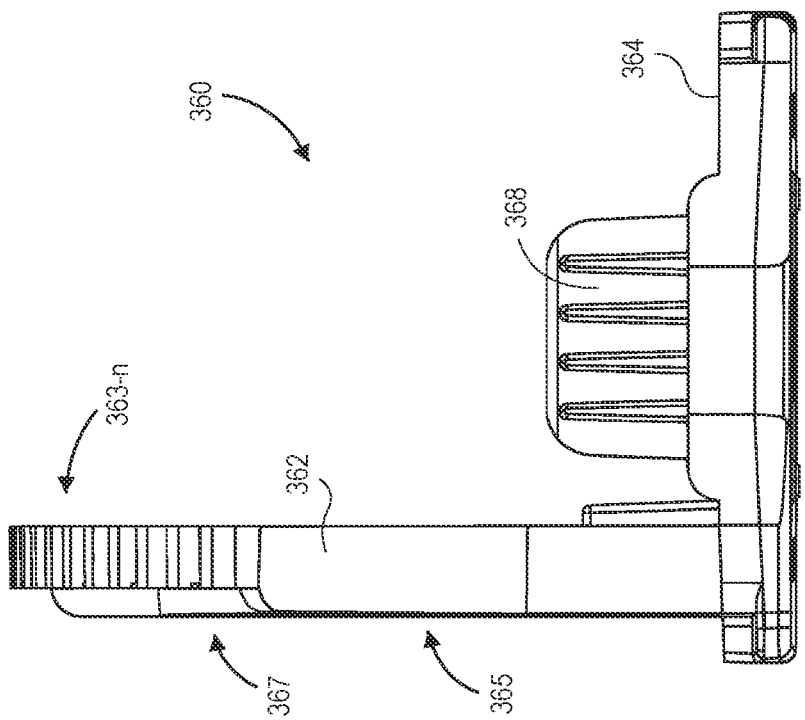
Figure 3G:
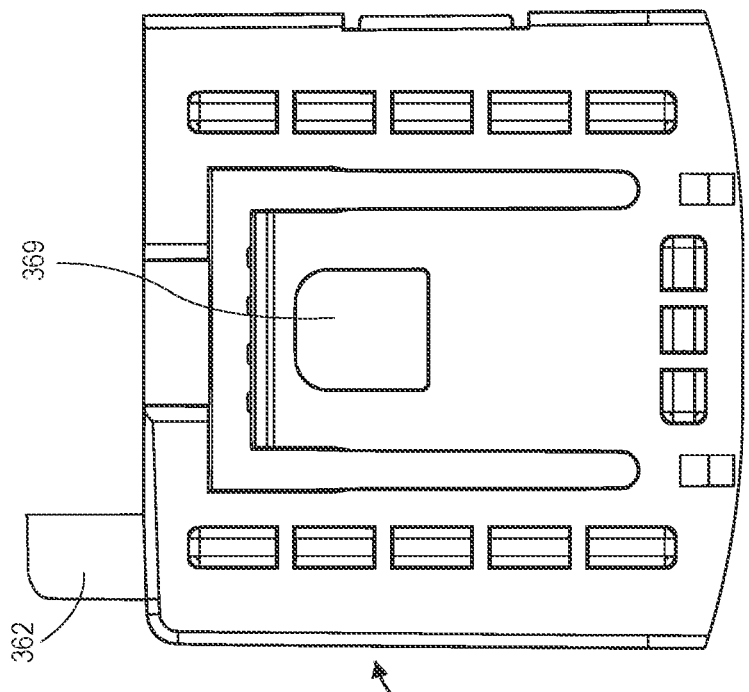
Figure 3F:
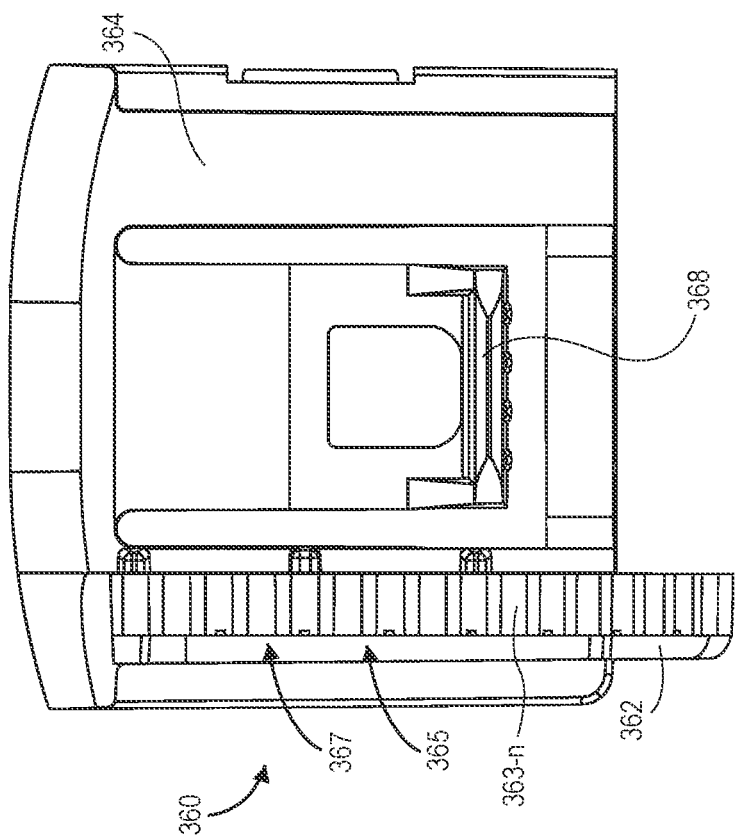

As is shown in FIGS. 3A through 3G, an arm 360 of a camera mount includes an extension 362 mounted in a substantially normal orientation with respect to a substantially flat slot interface 364. FIG. 3A is a perspective view of the arm 360, which includes one or more features or elements that are similar to features or elements of the lower arm 160 of FIGS. 1A through 1D, but may be provided in any location or orientation with respect to another arm, or any other aspects of a camera mount or a camera system in accordance with implementations of the present disclosure. FIGS. 3B and 3C are front and rear views, respectively, of the arm 360. FIGS. 3D and 3E are left and right views, respectively, of the arm 360. FIGS. 3F and 3G are top and bottom views, respectively, of the arm 360.

As is also shown in FIGS. 3A through 3G, the extension 362 has a shape and a cross-section of a fan, or a circular sector. The extension 362 includes a plurality of notches (or other indentations) 363-n on an outer arc of the extension 362, along with a bore 365 and an arcuate slot 367. Each of the notches 363-n is defined by a pair of teeth or other extensions that are aligned alongside one of the notches 363-n, and extend radially outward from a center of the bore 365. In some implementations, pairs of adjacent notches 363-n may define a fixed angular interval, such as five degrees. In some implementations, pairs of adjacent notches 363-n may define different angular intervals. Additionally, the arcuate slot 367 is defined by a pair of arcuate surfaces that are located at different radii from the bore 365, and a pair of rounded ends. An angle subtended by the arcuate slot 367 is approximately the same as an angle subtended by the plurality of notches 363-n on the outer arc of the extension 362.

The arm 360 may be joined to another arm e.g., the upper arm 150 of FIGS. 1A through 1D, or the arm 250 of FIGS. 2A through 2G, by one or more fasteners to form an assembly in a manner that enables the arm 360 and the other arm to pivot or rotate with respect to one another, and to establish a desired angle between the arm 360 and the other arm. The arm 360 may be joined to another arm by a screw, e.g., a low-profile head screw, or any other fastener that may extend through the bore 365 in a manner that permits the arm 360 and the other arm to pivot or rotate with respect to one another about a point defined by the bore 365. In some implementations, an arm, such as the arm 250 of FIGS. 2A through 2G, may include a raised boss or another element that extends through the bore 365. With the boss extended therein, that arm and the arm 360 may rotate or pivot with respect to one another about an axis defined the boss or the arm 360. A fastener for joining the arm 360 to that arm may extend through the bore 365 and into that boss or other opening. Additionally, a fastener, such as a carriage bolt, may extend through the arcuate slot 367, and a maximum range or extent by which the arm 360 and the other arm may pivot or rotate with respect to one another may be defined by contact between that fastener and ends of the arcuate slot 367.

Moreover, where another arm is pivotably joined to the arm 360, e.g., by a fastener inserted through the bore 365, and the other arm includes a detent (not shown) or other like system, the arm 360 may reversibly rotate with respect to the other arm in either rotational direction about an axis defined by the bore 365, with the rotation being temporarily interrupted at the various angular intervals when the detent is aligned in one of the notches 363-n, and an angle of the arm 360 with respect to the other arm being defined by the one of the notches 363-*n* into which the detent or other like system is inserted.

Additionally, the slot interface 364 is a substantially flat panel or platform that is joined to and aligned substantially normal to an underside of the extension 362. The slot interface 364 may have a cross-sectional area or shape that corresponds to an area and at least a portion of a shape of a corresponding slot or opening of a camera assembly. The slot interface 364 may be releasably slid into or joined to the slot or opening of the camera assembly. For example, as is shown in FIGS. 3A, 3F and 3G, the slot interface 364 features a substantially square shape, with three straight sides or edges and a fourth rounded side or edge. The slot interface 364 is configured for slidable insertion into a corresponding slot or opening of a camera assembly which may, for example, have a cross-sectional area and shape corresponding to at least the three straight sides or edges of the slot interface 364, to resist relative rotation between the lower arm 360 and the camera assembly into which the slot interface 364 is inserted.

The arm 360 further includes an operator 368 that extends above one side of the slot interface 364, e.g., the side of the slot interface 364 to which the extension 362 is joined, and is associated with a latch 369 provided below another side of the slot interface 364. The latch 369 may be a spring-biased extension or component that may have a size and shape that correspond to a notch or other aspect of a slot or other opening of a camera assembly. The latch 369 may be biased, e.g., by one or more springs, to extend away from the slot interface 364, thereby causing the slot interface 364 to engage with the slot or other opening of the camera assembly. The operator 368 is a substantially planar system or extension that may be manually activated, e.g., by a thumb or another finger, to overcome the bias of the latch 369, and to thereby disengage and release the arm 360 from a slot or other opening of a camera assembly into which the slot interface 364 is inserted.

As is shown in FIG. 3D, the extension 362 further includes a plurality of visual markings 369-*m* provided in association with some of the notches 363-*n*. Each of the visual markings 369-*m* corresponds to an angle about an axis defined at least in part by the bore 365 about which the arm 360 is oriented with respect to another arm pivotably joined thereto. For example, as is shown in FIG. 3D, the visual markings 369-*m* are provided in ten degree intervals, e.g., from −10 to +50 degrees, and each of the intervals between respective ones of the visual markings 369-*m* includes a pair of the notches 363-*n*, which are therefore provided at five degree intervals. An angle of the arm 360 with respect to the other arm may be identified by the one of the notches 363-*n* into which a detent or another like system of the other arm is inserted, with the detent or other like system acting as a visual identifier of the angle of the arm 360 with respect to the other arm. Alternatively, in some implementations, the visual markings 369-*m* may be provided at any interval other than ten degrees, or in any number with respect to the intervals or numbers of the notches 363-*n* other than two. In some other implementations, however, the arm 360 need not include any such visual markings.

Referring to FIGS. 4A through 4G, views of aspects of one component of a camera mount in accordance with implementations of the present disclosure. Except where otherwise noted, reference numerals preceded by the number "4" shown in FIGS. 4A through 4G indicate components or features that are similar to components or features having reference numerals preceded by the number "3" shown in FIGS. 3A through 3G, by the number "2" shown in FIGS. 2A through 2G or by the number "1" shown in FIGS. 1A through 1D.

As is shown in FIGS. 4A through 4G, a pocket 430 of a camera mount includes a panel 432 and a cavity 434 provided opposite the panel 432. The panel 432 features a substantially planar upper surface and has a substantially octagonal shape. The cavity 434 has an internal cross-section with a substantially octagonal shape, and is adapted to accommodate one end of one arm of a pivotable assembly having the same or a similar shape and a corresponding area.

Additionally, the pocket 430 further includes a pair of guides 436 that are mounted to opposing sides of the panel 432, and extend in parallel vertically above the upper surface of the panel 432. Moreover, the pocket 430 also includes a mounting clip 435 and a mounting extension 437 provided on opposing sides of the panel 432. The mounting clip 435 includes a J-shape that descends below the pocket 430 before curving and has a barbed (or flared) tip or edge that extends above the panel 432, with the shape of the mounting clip 435 providing enhanced flexibility. The mounting extension 437 extends substantially horizontally outward from one edge of the panel 432.

When the pocket 430 is prepared for mounting to a track (or a profile, a rail, or another system), or when the pocket 430 is so mounted, the track may be aligned between the guides 436, the mounting extension 437 may be inserted into a first slot or opening within the track, and the mounting clip 435 may be inserted into a second slot or opening within the track, e.g., in a snap-fit manner, or via a snap-fit connection.

A distance between the mounting clip 435 and the mounting extension 437 of the pocket 430 may be selected to correspond to a distance between pairs of slots or other openings within a track (or a profile, a rail, or another system). Furthermore, the mounting extension 437 may be substantially rigid in nature, and the mounting clip 435 may be flexible in nature. For example, in some implementations, the mounting extension 437 may be inserted into a slot or another opening of the track, and the pocket 430 may be aligned to accommodate the track between the guides 436. The mounting clip 435 may then be flexibly inserted into another of the openings of the track, such as by urging the tip of mounting clip 435 into a slot or another opening. Alternatively, in some implementations, a camera module may include any number or type of mounting clips, e.g., two or more of the mounting clips 435, or components for installing the pocket 430 or a camera system within a track, and such clips may operate in a snap-fit manner, or in any other manner.

The pocket 430 further includes an operator 438 having a tab extending radially outward from one edge of the pocket 430, and a latch or another extension portion extending radially into the cavity 434. The operator 438 may be mounted with respect to the cavity 434 in a rotatable or pivotable manner that permits the latch or the other extension to rotate or pivot into the cavity 434, or away from the cavity 434, in response to a corresponding manual activation of the operator 438. When an end of an arm is releasably inserted into the cavity 434, e.g., the panel 252 of the arm 250 of FIGS. 2A through 2G, the end of the arm is retained by the latch or other extension of the operator 438, which may be rotated or pivoted away from the cavity 434 temporarily in order to accommodate the end of the arm therein, and rotated or pivoted toward the cavity 434 after the end of the arm has been inserted therein. To release the end of the arm from the cavity 434, the tab of the operator 438 may be manually activated to cause the latch or the other extension portion to temporarily rotate or pivot away from the cavity 434, thereby permitting the end of the arm to be removed from the cavity 434. In some implementations, the operator 438 may be biased, e.g., by one or more springs or other biasing elements, to rotate the latch or the other extension portion into the cavity 434. Any bias supplied to the operator 438 by such biasing elements may be overcome by a manual activation of the tab.

The pocket 430 also includes a plurality of biasing elements 431, e.g., spring fingers, that are aligned to provide biasing forces in directions above the upper surface of the panel 432 or into the cavity 434. For example, where the pocket 430 is mounted to a track (or a profile, a rail or another system), e.g., by placing the track between the guides 436, and inserting the mounting clip 435 and the mounting extension 437 in corresponding slots or openings of the track, one or more of the biasing elements 431 may apply pressure from the upper surface of the panel 432 to the track, to reduce or inhibit the effects of any vibrations, impacts, shocks or other adverse events on a camera assembly mounted thereto, e.g., by way of a pivotable assembly, or images captured by one or more camera modules of the camera assembly.

In a similar manner, where a portion of an arm (e.g., the panel 252 of the arm 250 shown in FIGS. 2A through 2G) is inserted into the cavity 434 and secured therein, e.g., by the operator 438, one or more of the biasing elements 431 may also apply pressure from an interior of the cavity 434 to the portion of the arm.

Figure 4A:
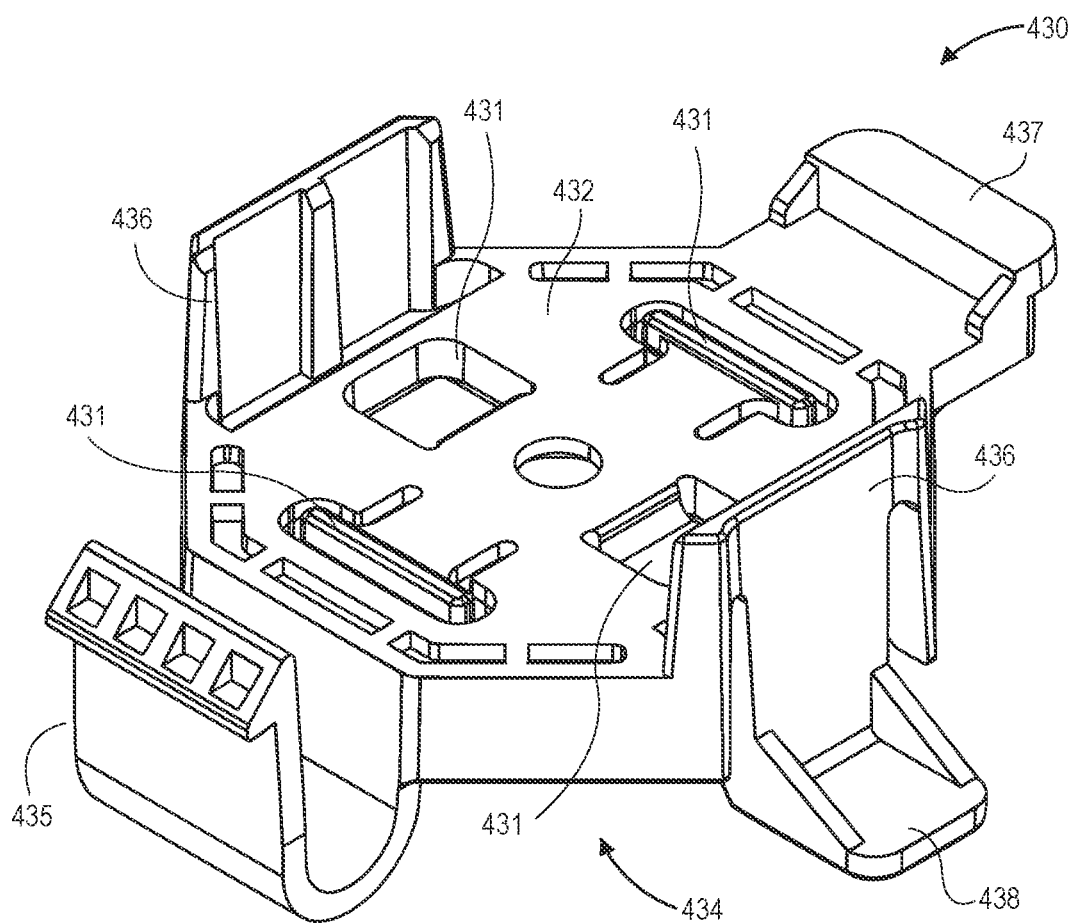
FIGS. 4A through 4G are views of aspects of one component of a camera mount in accordance with implementations of the present disclosure.
Figure 4B:
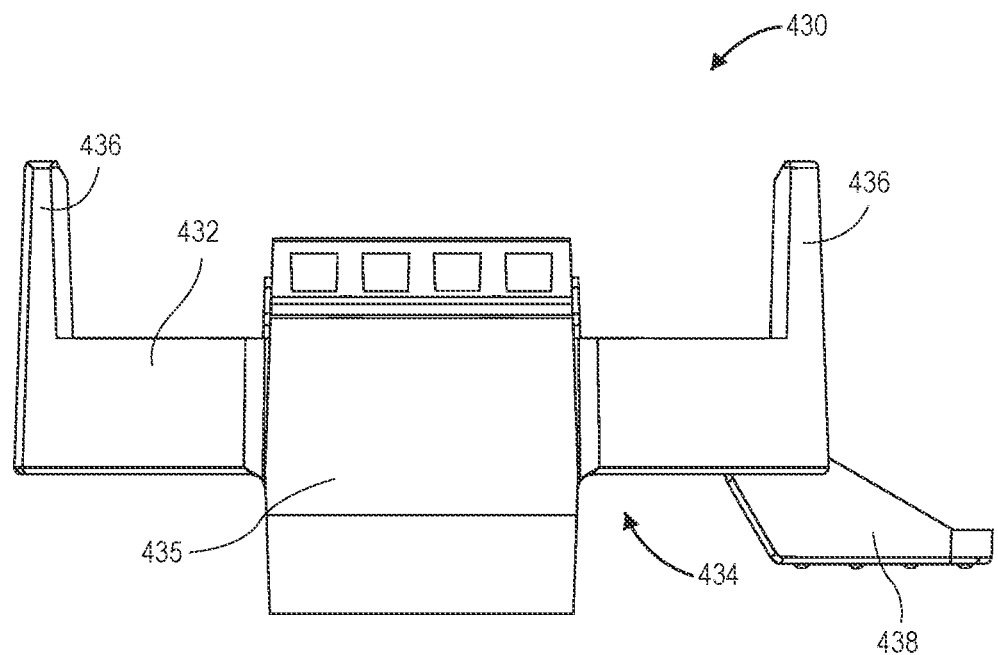
Figure 4C:
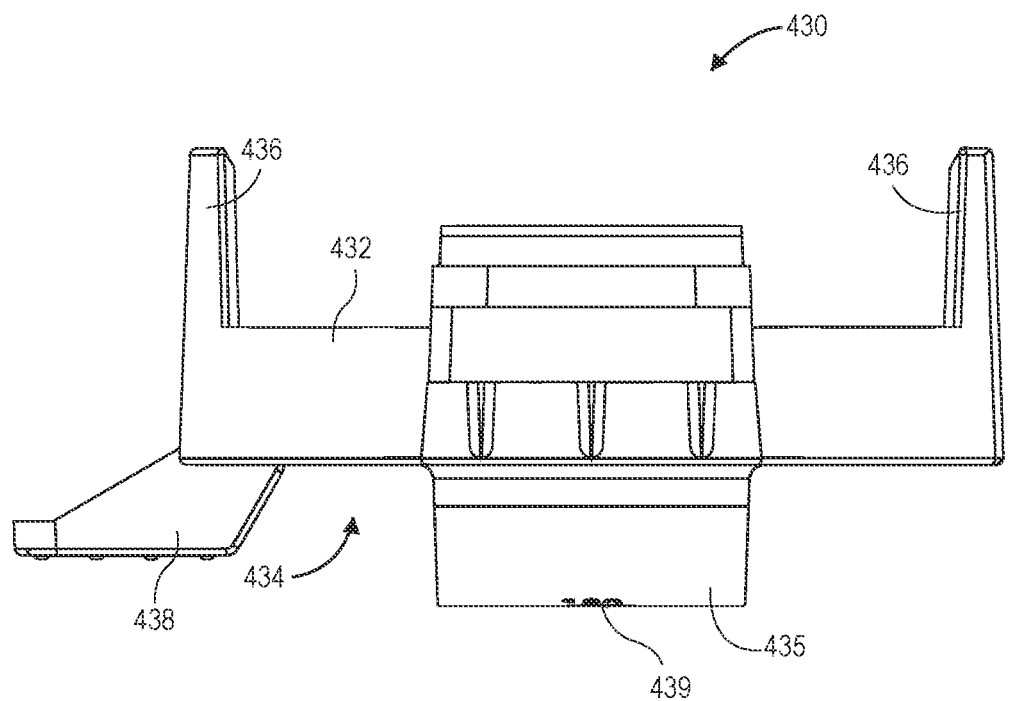
Figure 4D:
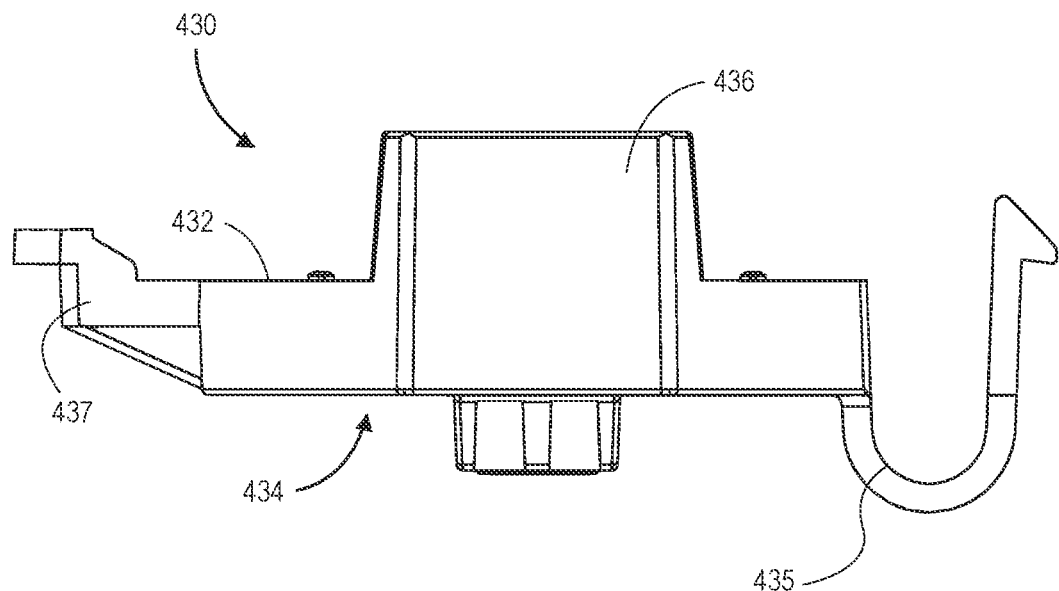
Figure 4E:
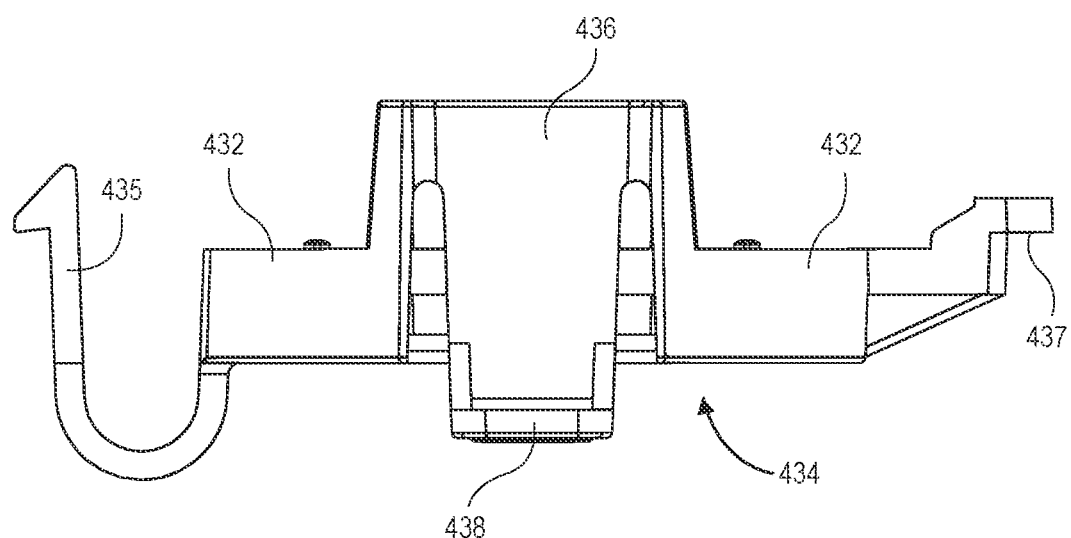
Figure 4G:
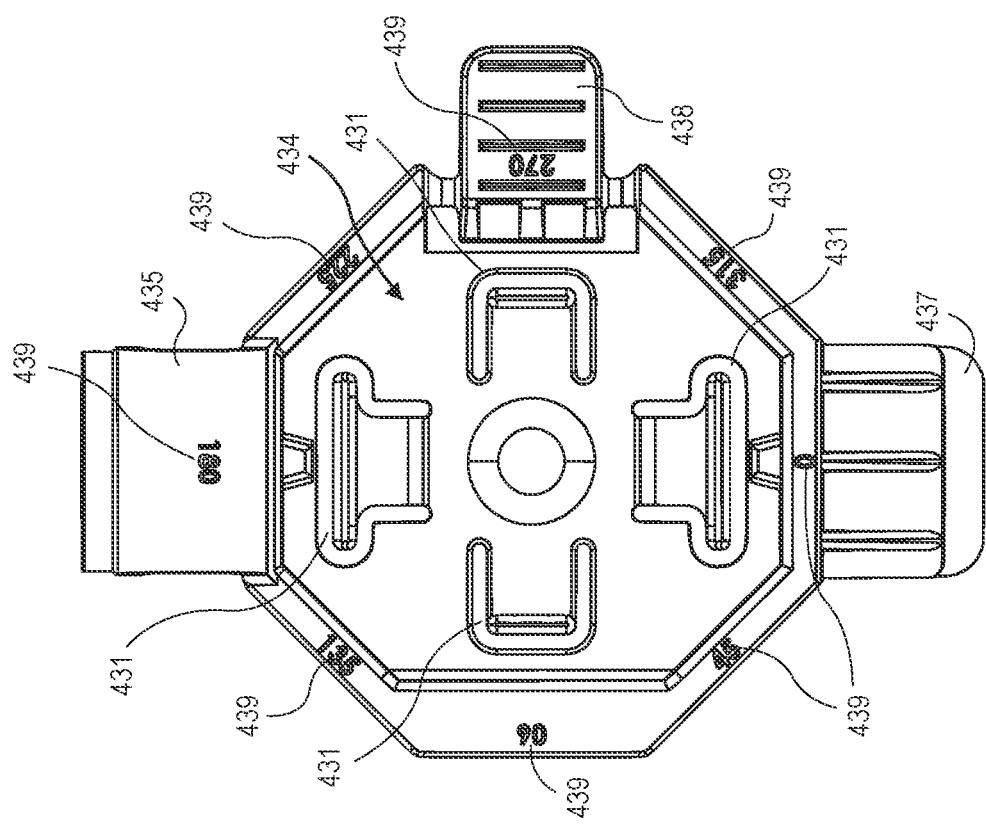
Figure 4F:
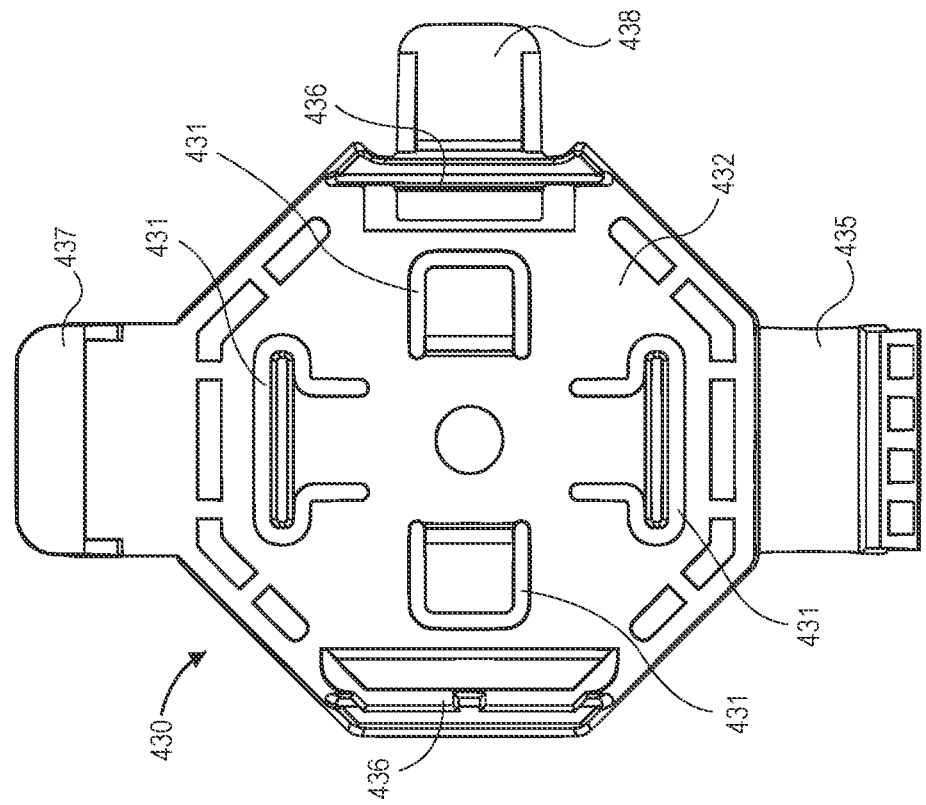

As is shown in FIG. 4G, the cavity 434 has a substantially octagonal cross-sectional shape, and is configured to accommodate an end of an arm of a pivotable assembly having the same shape and a corresponding area. Alternatively, in some implementations, the cavity 434 may have an internal cross-section with a shape of any other polygon (preferably a regular polygon), or any other shape, and may be configured to accommodate an end of one arm of a pivotable assembly having the same shape and a corresponding area. Furthermore, in some implementations, the panel 432 and the internal cross-section of the cavity 434 may have the same shape, as is shown in FIGS. 4A through 4G, or a different shape.

As is further shown in FIGS. 4C and 4G, an underside of the cavity 434 further includes a plurality of visual markings 439 provided in association with each of the sides of the cavity 434. As is discussed above, because the cavity 434 has an internal cross-section with a substantially octagonal shape, the cavity 434 can accommodate one arm of a pivotable assembly, e.g., the panel 252 of the arm 250 of FIGS. 2A through 2G, in one of eight discrete alignments or orientations, each of which is separated by forty-five degrees. The visual markings 439 thus indicate each of the alignments or orientations in degrees, e.g., 0, 45, 90, 135, 180, 225, 270 and 315 degrees, at or near each of the edges of the cavity 434, on the mounting clip 435 or the operator 438.

As is discussed above, where a pivotable assembly is formed from a pair of arms, an angle between the arms may be defined or identified based on a notch or other indentation of one arm into which a detent or another system of another arm is inserted.

Referring to FIGS. 5A and 5B, views of aspects of one system including a camera mount in accordance with implementations of the present disclosure. Except where otherwise noted, reference numerals preceded by the number "5" shown in FIGS. 5A and 5B indicate components or features that are similar to components or features having reference numerals preceded by the number "4" shown in FIGS. 4A through 4G, by the number "3" shown in FIGS. 3A through 3G, by the number "2" shown in FIGS. 2A through 2G or by the number "1" shown in FIGS. 1A through 1D.

As is shown in FIGS. 5A and 5B, a pivotable assembly 540 includes a first arm 550 and a second arm 560 that are joined to one another by a fastener 542 (e.g., a screw) and a fastener 544. The first arm 550 and the second arm 560 are configured to rotate with respect to one another about an axis defined by the fastener 542 or an opening into which the fastener 542 is provided. The first arm 550 includes a detent 558 that is aligned for insertion into one of a plurality of notches 563-$n$ provided in an arcuate upper edge of the second arm 560. An angle of the first arm 550 with respect to the second arm 560 about the axis defined by the fastener 542 or an opening into which the fastener 542 is provided is determined based on one of the plurality of notches 563-$n$ into which the detent 558 is inserted.

For example, as is shown in FIG. 5A, the first arm 550 is aligned with respect to the second arm 560 at an angle $\alpha_1$, or an angle of −10 degrees, about the axis defined by the fastener 542 or an opening into which the fastener 542 is provided. The angle $\alpha_1$ is determined or identified based on a notch 563A of the notches 563-$n$ into which the detent 558 is inserted.

With the first arm 550 and the second arm 560 at the angle $\alpha_1$ with respect to one another about the axis defined by the fastener 542 or the other fastener, the first arm 550 and the second arm 560 may be fixed or locked in relative position with respect to one another by the fastener 544, which extends through an arcuate slot 567 in the second arm 560, and may be tightened or secured by a threaded nut, such as a wingnut (not shown).

As is shown in FIG. 5B, the first arm 550 is aligned with respect to the second arm 560 at an angle $\alpha_2$, or an angle of +50 degrees, about the axis defined by the fastener 542 or an opening into which the fastener 542 is provided. The angle $\alpha_2$ is determined or identified based on a notch 563B of the notches 563-$n$ into which the detent 558 is inserted.

With the first arm 550 and the second arm 560 at the angle $\alpha_2$ with respect to one another about the axis defined by the fastener 542 or the other fastener, the first arm 550 and the second arm 560 may be fixed or locked in relative position with respect to one another by the fastener 544, which may be tightened or secured by a threaded nut (not shown).

Figure 6A:
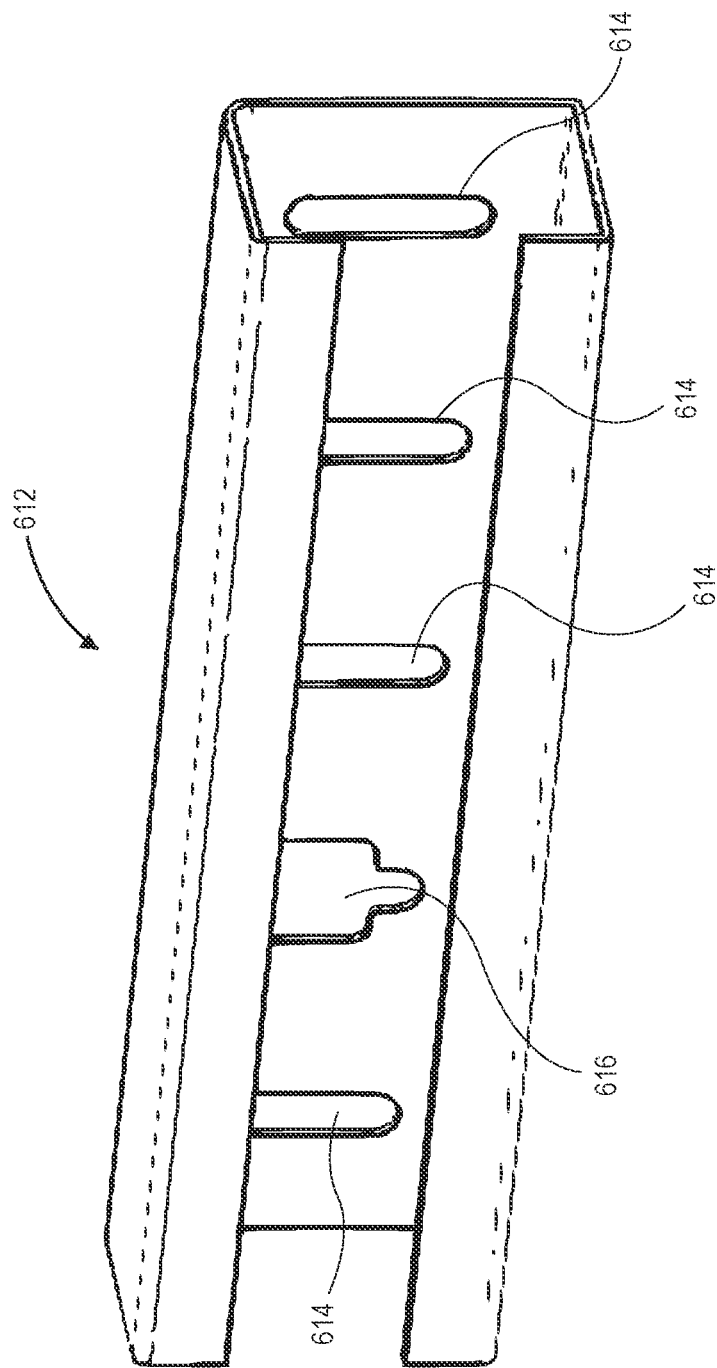
FIGS. 6A through 6C are views of aspects of one system including a camera mount in accordance with implementations of the present disclosure.
Figure 6B:
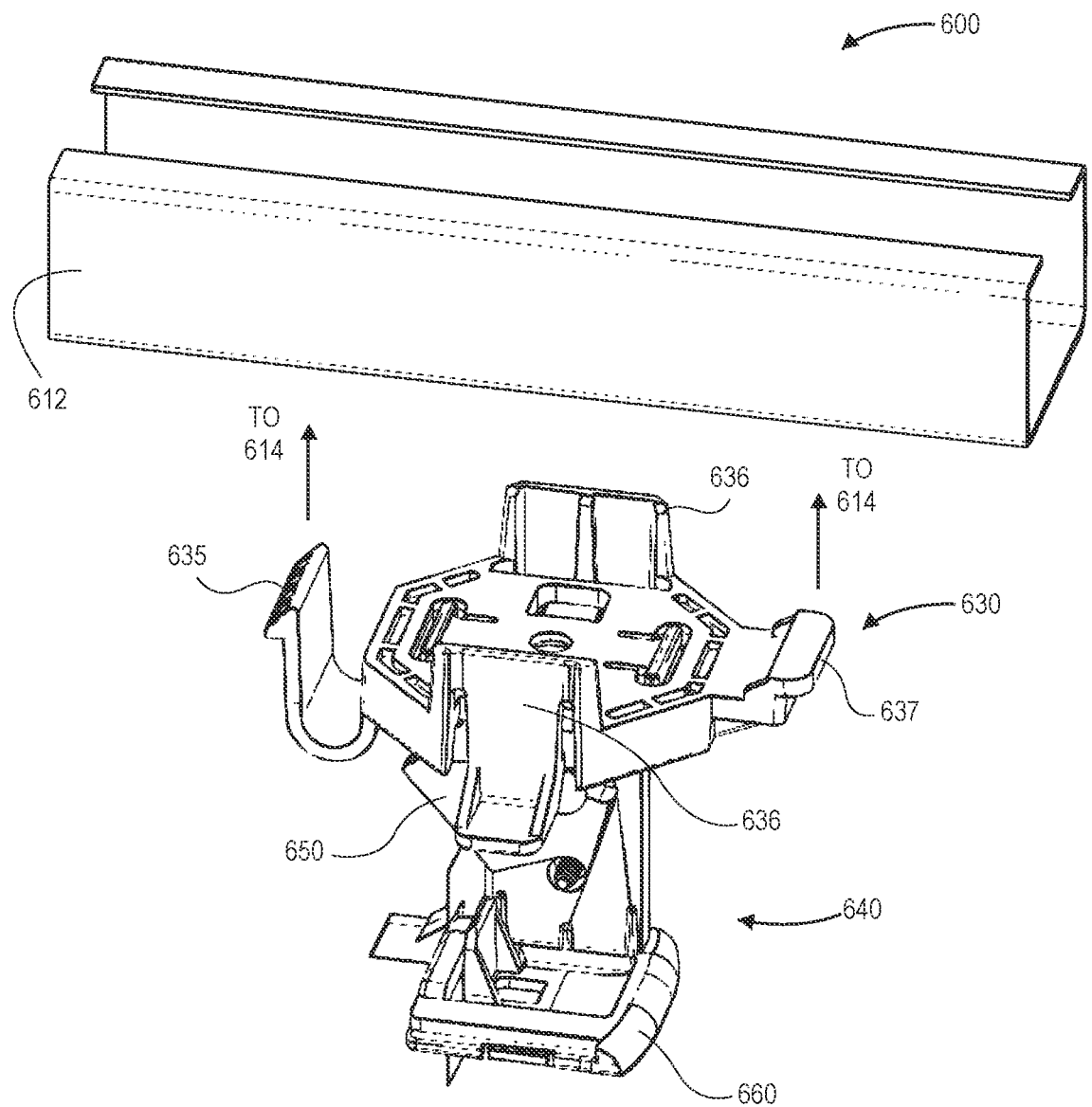
Figure 6C:
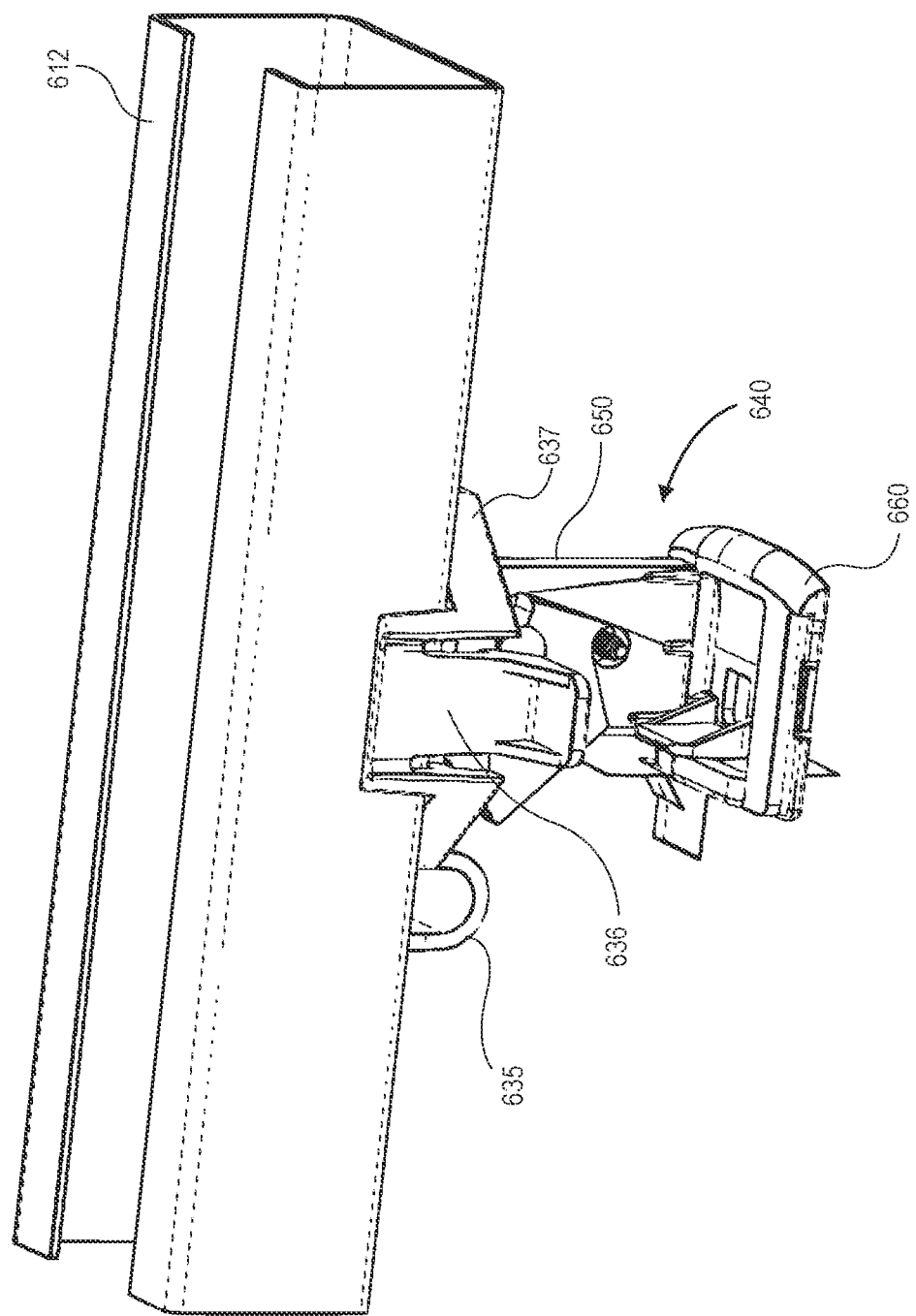

Referring to FIGS. 6A through 6C, views of aspects of one system including a camera mount in accordance with implementations of the present disclosure. Except where otherwise noted, reference numerals preceded by the number "6" shown in FIGS. 6A through 6C indicate components or features that are similar to components or features having reference numerals preceded by the number "5" shown in FIGS. 5A and 5B, by the number "4" shown in FIGS. 4A through 4G, by the number "3" shown in FIGS. 3A through 3G, by the number "2" shown in FIGS. 2A through 2G or by the number "1" shown in FIGS. 1A through 1D.

As is shown in FIG. 6A, a track (or a profile, or a rail, or another system) 612 is an elongated object having a C-shaped cross-section defined by a substantially flat web and a pair of flanges extending normal to parallel edges of the web. Additionally, the web of the track 612 also acts as an operating surface having a plurality of slots 614 or other openings, which may be provided at fixed intervals or distances from one another. The slots 614 may be sized to accommodate one or more components of a camera mount, e.g., the mounting clip 415 and the mounting extension 417 of the pocket 430 of FIGS. 4A through 4G, which may be separated by a distance that corresponds to one or more intervals or distances between the slots 614. Additionally, at least one of the slots provided in the track 612, e.g., a slot 616, may be further sized to further accommodate one or more electrical connectors (e.g., cables) for providing power, network connectivity or other services to a camera assembly joined to a pivotable assembly of a camera mount (not shown in FIG. 6A).

As is shown in FIG. 6B, a camera mount including a pocket 630 coupled to a pivotable assembly 640 formed from a first arm 650 and a second arm 660 is being installed on the track 612. The pocket 630 includes one or more features or elements that are similar to features or elements of the upper arm 430 of FIGS. 4A through 4G, but may be provided in any location or orientation with respect to another arm, or any other aspects of a camera mount or a camera system in accordance with implementations of the present disclosure.

In particular, as is shown in FIG. 6B, the pocket 630 includes a mounting clip 635, a pair of guides 636 and a mounting extension 637. The guides 636 of the pocket 630 may be aligned along the longitudinal flanges of the track 612, and the track 612 may be maintained in parallel between the flanges of the track 612. Additionally, with the pocket 630 aligned with the track 612, the pocket 630 may be installed into the track 612, such as is shown in FIG. 6C, by inserting the mounting clip 635 and the mounting extension 637 into two of the slots 614. For example, in some implementations, the mounting extension 637 may be inserted into one of the slots 614, e.g., by rotating the pocket 630 to raise and align the mounting extension 637 with the one of the slots 614. After the mounting extension 637 has been inserted into the one of the slots 614, the mounting clip 635 may be inserted into another of the slots 614, e.g., by rotating the pocket 630 in an opposite direction, and urging the tip of the mounting clip 635 into another of the slots 614.

The track 612 may be mounted to any ceilings, walls or other fixtures of a materials handling facility or another environment. Additionally, the track 612 may have any length, and may contain any number of slots or other openings for accommodating aspects of camera mounts, e.g., the mounting clip 635 and the mounting extension 637 of FIG. 6B. Moreover, any number of camera mounts may be installed into the track 612.

Aspects of camera assemblies or systems may be installed to tracks or other systems in any order or sequence in accordance with implementations of the present disclosure. For example, in some implementations, an angle of a pivotable assembly may be established between a pair of arms. One end of the pivotable assembly may be inserted into a cavity of a pocket in a desired alignment or orientation, and a camera assembly may be mounted to another end of the pivotable assembly. With the pivotable assembly mounted to the pocket, and the camera assembly mounted to the pivotable assembly, such as is shown in FIG. 6B, the pocket may be installed on a track (or a profile, or a rail, or another system) in a desired position, with the camera assembly aligned at a yaw and a pitch angle defined by the angle of the pivotable assembly established by the arms and the alignment or orientation of the pivotable assembly with respect to the cavity of the pocket.

As another example, a pocket may be independently installed in a track (or a profile, or a rail, or another system). With the pocket installed in the track, an angle of a pivotable assembly may be established between a pair of arms, and one end of the pivotable assembly may be inserted into a cavity of the pocket in a desired alignment or orientation.

With the pivotable assembly inserted into the cavity of the pocket, a camera assembly may be mounted to another end of the pivotable assembly, such that the camera assembly is aligned at a yaw and a pitch angle defined by the angle of the pivotable assembly established by the arms and the alignment or orientation of the pivotable assembly with respect to the cavity of the pocket Alternatively, components of a camera system may be mounted to a track (or a profile, or a rail, or another system) in any other manner, and in any other order or sequence.

Camera assemblies or systems having any number of camera modules there may be mounted to distal ends of camera mounts or pivotable assemblies of the present disclosure, such as by slidably inserting a camera assembly onto a slot interface, as is shown in FIG. 1D. Such camera modules may be configured to capture color images, grayscale images, black-and-white images, or any other type or form of imaging data (e.g., depth images), and may include camera sensors that are configured to capture visual imaging data at relatively high levels of resolution, e.g., eight to nine megapixels per image, and at relatively high frame rates, e.g., fifteen or more frames per second (fps).

Moreover, images captured by camera modules of the present disclosure may be utilized for any purpose. For example, one or more of such images may be provided to a server or other computer device or system over a network, which may include the Internet in whole or in part. In some implementations, a server or another device or system may process images captured by a camera module to generate trajectories representing locations, movements or orientations of any actors depicted therein, or any other record of activity occurring within a field of view of the camera module.

Accordingly, the camera modules of the present disclosure may be provided in any environment or scene, such as a retail establishment or another materials handling facility, and aligned to capture imaging data occurring at such environments or scenes. The camera modules of the present disclosure may be mounted above such scenes, such as to ceilings, false ceilings (e.g., to poles, frames, panels or joints), trusses, beams, or other systems. For example, one or more camera assemblies may be mounted directly to such systems, by way of a camera mount of the present disclosure, or in any other manner. Alternatively, in some implementations, a camera assembly or a camera module of the present disclosure may be mounted to an underside of a structure, such as a shelf, an arch or a bridge, or to an elevated system such as a pole or stanchion. In still other implementations, a camera assembly or a camera module may be mounted to a wall or other vertical surface in an alignment such that axes of orientation of the camera module extend within horizontal planes, or planes that are aligned at angles other than vertical.

Figure 7:
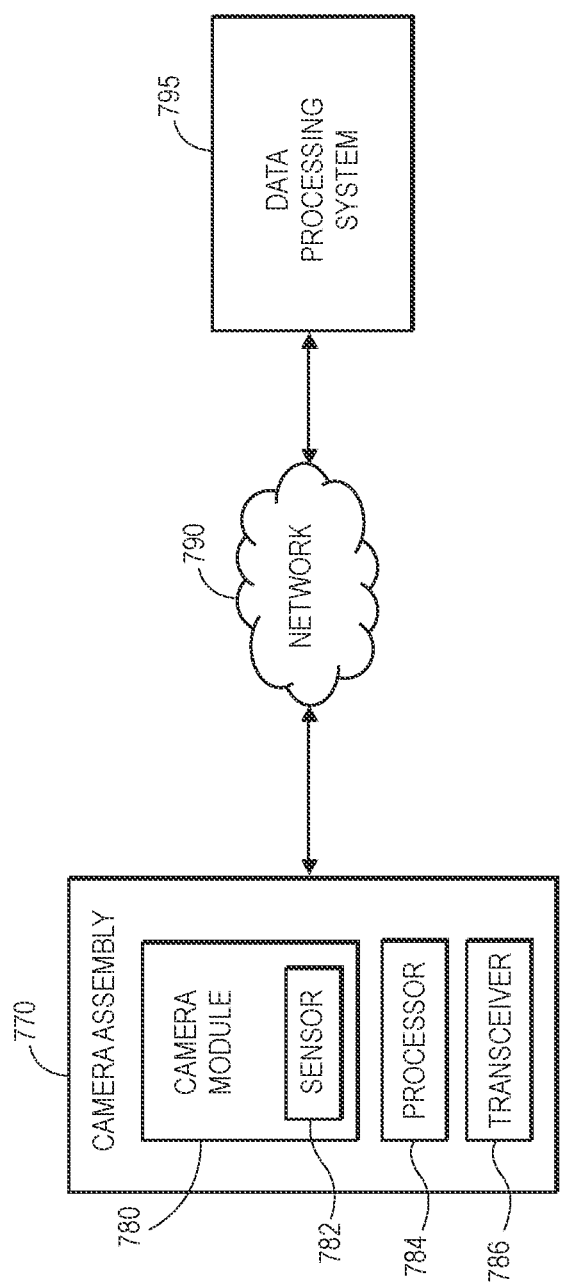
FIG. 7 is a block diagram of components of one system that may be utilized with a camera mount in accordance with implementations of the present disclosure.

Referring to FIG. 7, a block diagram of diagrams of one system that may be utilized in connection with a camera mount in accordance with implementations of the present disclosure are shown. Except where otherwise noted, reference numerals preceded by the number "7" shown in FIG. 7 indicate components or features that are similar to components or features having reference numerals preceded by the number "6" shown in FIGS. 6A through 6C, by the number "5" shown in FIGS. 5A and 5B, by the number "4" shown in FIGS. 4A through 4G, by the number "3" shown in FIGS. 3A through 3G, by the number "2" shown in FIGS. 2A through 2G or by the number "1" shown in FIGS. 1A through 1D.

The system of FIG. 7 includes a camera assembly 770 and a data processing system 795 that are connected to one another over a network 790, which may include the Internet, in whole or in part. As is shown in FIG. 7, the camera assembly 770 includes a camera module 780 having one or more sensors 782, well as one or more processors 784 and one or more transceivers 786 or other communications systems.

The camera assembly 770 may be any device or system that is configured for mounting to one or more elevated surfaces above an environment or scene, such as a retail establishment or another materials handling facility, and for capturing imaging data regarding events occurring within the environment or scene. The camera assembly 770 may include any number of camera modules, viz., the camera module 780, that are mounted within housings and feature axes of orientation extending normal to and away from the housings.

The camera module 780 may be any form of optical recording devices that may be used to photograph or otherwise record imaging data of structures, facilities, terrain or any other elements appearing within their respective fields of view. The sensor 782 may include any number of sensors, such as color sensors, grayscale sensors, black-and-white sensors, or other visual sensors, as well as depth sensors or any other type of sensors, that are configured to capture visual imaging data (e.g., textures) or depth imaging data (e.g., ranges) to objects within one or more fields of view of the camera module 780. In some implementations, the sensor 782 may have single elements or a plurality of photoreceptors or photosensitive components (e.g., a CCD sensor, a CMOS sensor, or another sensor), which may be typically arranged in an array. Light reflected from objects within fields of view of the camera module 780 may be captured by the sensor 782, and quantitative values, e.g., pixels, may be assigned to one or more aspects of the reflected light.

In addition to the one or more sensor 782, the processor 784 and the transceiver 786, the camera module 780 may also include any number of other components that may be required in order to capture, analyze and/or store imaging data, including but not limited to one or more lenses, memory or storage components, photosensitive surfaces, filters, chips, electrodes, clocks, boards, timers, power sources, connectors or any other relevant features (not shown). Additionally, in some implementations, each of the sensor 782 may be provided on a substrate (e.g., a circuit board) and/or in association with a stabilization module having one or more springs or other systems for compensating for motion of the camera module 780 or the sensor 782, or any vibration affecting the sensor 782.

The camera module 780 may capture imaging data in the form of one or more still or moving images (e.g., streams of visual and/or depth image frames), along with any relevant audio signals or other information (e.g., position data). The camera assembly 770 and/or the camera module 780 may also include one or more illuminators (not shown), such as laser systems or light-emitting diodes (or "LED") for illuminating portions of environments or scenes appearing within a field of view of the camera module 780, as necessary.

The processor 784 may be configured to process imaging data captured by one or more of the sensors 782. For example, in some implementations, the processor 784 may be configured to execute any type or form of machine learning tools or technique, e.g., an artificial neural network.

The transceiver 786 enables the camera assembly 770 to communicate with the data processing system 795 or any other external devices, systems or components by way of the network 790. In some implementations, the camera assembly 770 may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the data processing system 795 or over the network 790 directly.

The camera assembly 770 may be deployed in any number, and may be homogenous or heterogeneous in nature, in accordance with the present disclosure. For example, one or more of the camera assembly 770 may include a camera module 780 having both a visual sensor (e.g., color, grayscale or black-and-white) and a depth sensor. Alternatively, the camera assembly 770 may include a camera module 780 having just a visual sensor, or just a depth sensor. For example, the camera module 780 may be an RGB color camera, a still camera, a motion capture/video camera or any other type or form of camera. In other implementations, the camera assembly 770 may include depth-sensing cameras, such as an RGBD or RGBz camera. In still other implementations, the camera assembly 770 may include a thermographic or infrared (IR) camera. Additionally, in some implementations, the camera assembly 770 may simply include camera modules that include a lens and an image sensor configured to convert an optical image obtained using the lens of the camera into a digital signal or digital representation of the image (generally referred to herein as imaging data).

Additionally, the processor 784 or other components of the camera module 770 may be configured to recognize characteristics of stationary or moving objects or portions thereof depicted in one or more digital images, and to match such characteristics against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects. For example, in some implementations, the processor 784 may be programmed to execute one or more machine learning algorithms, tools or techniques.

In some implementations, components of the camera module 770 may be self-powered, e.g., by one or more internal or onboard power sources, such as batteries or fuel cells. In some other implementations, however, components of the camera module 770 may receive power of any type or form from one or more external power sources, e.g., by one or more conductors or other connectors. Accordingly, the camera module 770 may include any number of transformers, converters (e.g., step-down converters), capacitors, resistors, inductors, transistors or other components for utilizing or altering power received from such external power sources. Furthermore, in some implementations, the camera module 770 may be configured to receive power via one or more connections or conductors that may also be provided for one or more other purposes, such as according to a PoE standard or system that may also be utilized to receive information or data from one or more external devices or systems, or to transfer information or data to one or more external devices or systems, e.g., over the network 790.

The network 790 may be any wired network, wireless network, or combination thereof, and may include the Internet in whole or in part. In addition, the network 790 may be a personal area network, local area network, wide area network, cable network, satellite network, cellular telephone network, or combination thereof. The network 790 may also be a publicly accessible network of linked networks, possibly operated by various distinct parties, such as the Internet. In some implementations, the network 790 may be a private or semi-private network, such as a corporate or university intranet. The network 790 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The data processing system 795 may include any number of physical computer servers having one or more computer processors and any number of data stores (e.g., databases) associated therewith, as well as provided for any specific or general purpose. For example, the data processing system 795 may be independently provided for the exclusive purpose of receiving, analyzing or storing imaging data or other information or data received from the camera assembly 770 or, alternatively, provided in connection with one or more physical or virtual services that are configured to receive, analyze or store such imaging data or other information or data, as well as to perform one or more other functions. In some implementations, the data processing system 795 may be associated with a materials handling facility, or any other physical or virtual facility.

The data processing system 795 may include any facilities, stations or locations having the ability or capacity to receive and store information or data, such as media files, in one or more data stores, e.g., media files received from the camera module 780 or from one or more other external computer systems (not shown) via the network 790. In some implementations, the data processing system 795 may be provided in a physical location. In other such implementations, the data processing system 795 may be provided in one or more alternate or virtual locations, e.g., in a "cloud"-based environment. In still other implementations, the data processing system 795 may be provided onboard one or more vehicles, e.g., an unmanned aerial vehicle.

Although FIG. 7 includes a single box corresponding to the camera assembly 770 and a single box corresponding to the camera module 780, and a single box corresponding to the data processing system 795, those of ordinary skill in the pertinent arts will recognize that any number or type of camera assemblies or camera modules may be operated in accordance with the present disclosure. For example, in some implementations, a system may include dozens or even hundreds of camera assemblies 770, camera modules 780 or data processing systems 795 of any type or form, which may be mounted in regular or irregular configurations over or in association with a materials handling facility or other environment or scene in any manner.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

Although some of the implementations disclosed herein reference the use of the camera mounts of the present disclosure in materials handling facilities or like environments, those of ordinary skill in the pertinent arts will recognize that the systems and methods disclosed herein are not so limited, and may be utilized in connection with cameras that are provided for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a track comprising a plurality of openings provided in one surface of the track;
   a pocket, wherein the pocket comprises an upper panel and a lower cavity opposite the upper panel,
      wherein the pocket further comprises a first guide extending normal to a first edge of the pocket and a second guide extending normal to a second edge of the pocket,
      wherein the pocket further comprises a mounting clip joined to a third edge of the pocket and a mounting extension joined to a fourth edge of the pocket,
      wherein the mounting clip is inserted into a first one of the plurality of openings via a snap-fit connection,
      wherein the mounting extension is inserted into a second one of the plurality of openings,
      wherein the first guide and the second guide are substantially parallel to one another,
      wherein the first edge and the second edge are provided on opposite edges of the pocket from one another, and
      wherein the third edge and the fourth edge are provided on opposite edges of the pocket from one another;
   a pivotable assembly comprising a first arm pivotably joined to a second arm,
      wherein the first arm comprises a first panel and an extension coupled normal to a lower side of the first panel,
      wherein the first arm further comprises a detent provided in association with one side of the extension,
      wherein an upper side of the first panel has a geometric shape and an area corresponding to a cross-sectional shape and a cross-sectional area of the lower cavity of the pocket,
      wherein the first panel is releasably inserted into the lower cavity of the pocket,
      wherein the second arm comprises a second panel having a shape of a circular sector and a slot interface coupled normal to the second panel, and
      wherein an arcuate edge of the second panel comprises a plurality of notches, and
      wherein the detent is inserted into one of the plurality of notches; and
   a camera assembly joined to the slot interface, wherein the slot interface is slidably inserted into an opening provided in a surface of a housing of the camera assembly, and
   wherein the camera assembly comprises a camera module and at least one sensor disposed therein.

2. The system of claim 1, wherein the first arm further comprises a raised boss on the one side of the extension,
   wherein the raised boss is inserted into a bore provided in the second panel,
   wherein the first arm is pivotably joined to the second arm by a first fastener extended into the raised boss,
   wherein the first arm and the second arm are configured to pivot with respect to one another about an axis defined by the raised boss, and
   wherein an angle of the first arm with respect to the second arm about the axis is defined by the one of the notches into which the detent is inserted.

3. The system of claim 2, wherein the second panel comprises an arcuate slot,
   wherein a second fastener extends parallel to the first fastener through a bore in the extension of the first arm and the arcuate slot provided in the second panel, and
   wherein a range of relative motion of the first arm with respect to the second arm is defined by the second fastener and the arcuate slot.

4. The system of claim 1, wherein the track is configured for mounting to one or more of a wall, a ceiling or a fixture in a materials handling facility, and
   wherein a width of the track is not greater than a distance between the first guide and the second guide.

5. The system of claim 1, wherein the slot interface comprises a substantially planar surface having a geometric shape and an area corresponding to the opening provided in the surface of the housing of the camera assembly.

6. The system of claim 1, wherein at least one of the first arm or the second arm is formed from at least one material comprising at least one of a polycarbonate, an acrylonitrile butadiene styrene, or a fiberglass, and
   wherein the track is formed from at least one of an extruded aluminum, a cold-rolled steel, or a bent metal.

7. A camera mount comprising:
   a pocket, wherein the pocket comprises an upper panel having a mounting clip and a mounting extension provided in association with first opposing edges of the upper panel, wherein the pocket further comprises a pair of guides extending normal to second opposing edges of the upper panel, and wherein the pocket defines a lower cavity provided beneath the upper panel; and
   a pivotable assembly comprising a first arm pivotably joined to a second arm by at least a first fastener,
      wherein the first arm comprises a first panel and a first extension coupled normal to a lower side of the first panel,
      wherein an upper side of the first panel has a geometric shape and an area corresponding to a cross-sectional shape and a cross-sectional area of the lower cavity of the pocket,
      wherein the first panel is releasably inserted into the lower cavity of the pocket in one of a plurality of discrete orientations,
      wherein the second arm comprises a second panel having an arcuate edge and a slot interface coupled normal to the second panel,
      wherein the first extension is aligned adjacent to the second panel,
      wherein an arcuate edge of the second panel comprises a plurality of notches, wherein the first arm further comprises a detent inserted into one of the plurality of notches,
      wherein the first arm and the second arm are configured to rotate with respect to one another about an axis defined at least in part by the first fastener,
      wherein an angle of the first arm with respect to the second arm about the axis is defined by one of the plurality of notches into which the detent is inserted, and
      wherein the first arm and the second arm are fixed at the angle by at least a second fastener.

8. The camera mount of claim 7, wherein the slot interface is releasably inserted into an opening provided in a housing of a camera assembly,
   wherein the camera assembly comprises at least one camera module having a sensor, a processor and a transceiver disposed therein, and
   wherein at least a portion of the slot provided in the housing of the camera assembly has a geometric shape corresponding to at least a portion of a geometric shape of the slot interface.

9. The camera mount of claim 7, wherein at least one of a yaw angle of the camera module or a pitch angle of the camera module is defined by the one of the plurality of discrete orientations and the angle of the first arm with respect to the second arm.

10. The camera mount of claim 7, wherein the geometric shape of the upper side of the first panel is a regular polygon, and
   wherein each of the plurality of discrete orientations is defined with respect to one of the sides of the regular polygon.

11. The camera mount of claim 10, wherein the regular polygon is a regular octagon.

12. The camera mount of claim 7, wherein adjacent pairs of the plurality of notches are separated by a common angular interval about the axis.

13. The camera mount of claim 7, wherein the camera mount is mounted to a track defined by a web having a pair of flanges extending from parallel edges of the web,
   wherein the web comprises a plurality of openings provided in the web,
   wherein the mounting clip is releasably inserted into a first opening of the plurality of openings by a snap-fit connection,
   wherein the mounting extension is releasably inserted into a second opening of the openings,
   wherein a distance between at least a portion of the mounting clip and at least a portion of the mounting extension corresponds to a distance between the first opening and the second opening, and
   wherein a first one of the flanges is aligned adjacent to a first one of the guides and a second one of the flanges is aligned adjacent to a second one of the guides.

14. The camera mount of claim 13, wherein the track is mounted to one or more of a wall, a ceiling or a fixture within a materials handling facility.

15. The camera mount of claim 7, wherein the first arm comprises a boss provided on a side of the first extension adjacent the second panel,
   wherein the boss is inserted into an opening provided in the second panel,
   wherein the first fastener is inserted into the boss, and
   wherein the axis is defined at least in part by the boss.

16. The camera mount of claim 7, wherein the second fastener extends parallel to the first fastener through a bore in the extension of the first arm and an arcuate slot provided in the second panel, and
   wherein a range of relative motion of the first arm with respect to the second arm is defined by the second fastener and the arcuate slot.

17. The camera mount of claim 7, wherein at least one of the first arm or the second arm is formed from at least one material comprising at least one of a polycarbonate, an acrylonitrile butadiene styrene, or a fiberglass.

18. A system comprising:
   a pocket mounted to a track by at least one snap-fit connection, wherein the pocket comprises an upper panel having a mounting clip and a mounting extension provided on first opposing edges of the upper panel, wherein the pocket further comprises a pair of guides extending normal to second opposing edges of the upper panel, and wherein the pocket defines a lower cavity provided beneath the upper panel; and
   a pivotable assembly comprising a first arm pivotably joined to a second arm by a first fastener,
      wherein the first arm comprises a first panel and a first extension coupled normal to a lower side of the first panel,
      wherein an upper side of the first panel has a geometric shape and an area corresponding to a cross-sectional shape and a cross-sectional area of the lower cavity of the pocket,
      wherein the first extension is aligned adjacent to the second panel,
      wherein the first panel is releasably inserted into the lower cavity of the pocket in a first orientation of a plurality of orientations,
      wherein the second arm comprises a second panel having an arcuate edge and a slot interface coupled normal to the second panel, and
      wherein the first arm is aligned with respect to the second arm at a first angle with respect to an axis defined at least in part by the first fastener,
      wherein the first arm and the second arm are fixed at the first angle by at least a second fastener; and
   a camera assembly releasably coupled to the second arm,
      wherein the slot interface is releasably inserted into a slot provided in a housing of the camera assembly,
      wherein the camera assembly comprises at least one camera module having a sensor, a processor and a transceiver disposed therein,
      wherein at least a portion of the slot provided in the outer housing of the camera assembly has a geometric shape corresponding to at least a portion of a geometric shape of the slot interface, and
      wherein at least one of a yaw angle or a pitch angle of the camera module is defined by at least one of the first orientation or the first angle.

19. The system of claim 18, wherein each of the geometric shape of the upper side of the first panel and the cross-sectional shape of the lower cavity is a regular polygon, and wherein each of the plurality of orientations is defined with respect to one of the sides of the regular polygon.

20. The system of claim 18, wherein the first arm comprises a boss provided on a side of the first extension adjacent the second panel,
   wherein the boss is inserted into a first opening provided in the second panel,
   wherein the first fastener is inserted into the boss,
   wherein the axis is defined at least in part by the boss,
   wherein the second fastener extends parallel to the first fastener through a second opening in first extension and an arcuate slot provided in the second panel, and
   wherein a range of relative motion of the first arm with respect to the second arm is defined by the second fastener and the arcuate slot.

* * * * *